United States Patent
Howe

(10) Patent No.: US 9,700,748 B2
(45) Date of Patent: Jul. 11, 2017

(54) METHOD AND SYSTEM OF MEASURING AN ACTIVITY OF A PERSON ON A FLEXIBLE MAT OF A TRAMPOLINE

(71) Applicants: BOARD & BATTEN INTERNATIONAL INC, Georgetown (KY); John Robert Howe, Christchurch (NZ)

(72) Inventor: John Robert Howe, Christchurch (NZ)

(73) Assignee: TGOMA NZ Limited, ChristChurch (NZ)

( * ) Notice: Subject to any disclaimer, the term of this patent is extended or adjusted under 35 U.S.C. 154(b) by 0 days.

(21) Appl. No.: 14/654,654

(22) PCT Filed: Dec. 20, 2013

(86) PCT No.: PCT/NZ2013/000245
§ 371 (c)(1),
(2) Date: Jun. 22, 2015

(87) PCT Pub. No.: WO2014/098628
PCT Pub. Date: Jun. 26, 2014

(65) Prior Publication Data
US 2015/0321039 A1 Nov. 12, 2015

Related U.S. Application Data

(60) Provisional application No. 61/740,549, filed on Dec. 21, 2012.

(51) Int. Cl.
*A63B 5/11* (2006.01)
*A63B 24/00* (2006.01)
(Continued)

(52) U.S. Cl.
CPC .......... *A63B 5/11* (2013.01); *A63B 24/0021* (2013.01); *A63B 24/0059* (2013.01);
(Continued)

(58) Field of Classification Search
CPC ... A63B 5/11; A63B 24/0059; A63B 24/0084; A63B 24/0075; A63B 71/0669;
(Continued)

(56) References Cited

U.S. PATENT DOCUMENTS 4,431,182 A 2/1984 Reynolds
5,674,157 A 10/1997 Wilkinson
(Continued)

FOREIGN PATENT DOCUMENTS

CA 2772801 9/2012
DE 102005051960 9/2006
(Continued)

OTHER PUBLICATIONS

EP Appln. No. 13865791.1, Euro. Extended Search Report, Jul. 25, 2016, pp. 1-9.
(Continued)

*Primary Examiner* — Sundhara Ganesan
(74) *Attorney, Agent, or Firm* — Dann, Dorfman, Herrell & Skillman, P.C.

(57) ABSTRACT

A method of measuring an activity of a person/object on a flexible mat of a trampoline, comprising: determining a mat deformation signal based at least on measurements from a sensor arrangement comprising at least one sensor and defining a coordinate space for the mat; the or each sensor being configured to measure a value corresponding to a deformation of the mat as the person/object moves on the mat; wherein, the value measured by die or each sensor corresponds to a proximity of the person/object to the sensor; determining a bounce coordinate in the coordinate spate based at least on the mat deformation signal; and determining a bounce location of the person/object on the mat based at least on the bounce coordinate in the coordinate space. Also provided is a trampoline configured to indicate
(Continued)

an activity of a person/object on the mat and an interactive apparatus that includes the trampoline.

30 Claims, 18 Drawing Sheets

(51) Int. Cl.
G01B 21/32 (2006.01)
G04F 8/00 (2006.01)
A63B 71/06 (2006.01)
A63B 71/02 (2006.01)

(52) U.S. Cl.
CPC ...... *A63B 24/0075* (2013.01); *A63B 24/0084* (2013.01); *A63B 71/0669* (2013.01); *G01B 21/32* (2013.01); *G04F 8/00* (2013.01); *A63B 71/022* (2013.01); *A63B 2024/0025* (2013.01); *A63B 2024/0028* (2013.01); *A63B 2024/0043* (2013.01); *A63B 2024/0068* (2013.01); *A63B 2210/50* (2013.01); *A63B 2220/10* (2013.01); *A63B 2220/13* (2013.01); *A63B 2220/20* (2013.01); *A63B 2220/40* (2013.01); *A63B 2220/62* (2013.01); *A63B 2220/803* (2013.01); *A63B 2220/833* (2013.01); *A63B 2225/50* (2013.01); *A63B 2230/75* (2013.01)

(58) Field of Classification Search
CPC ........ A63B 2024/0068; A63B 2230/75; A63B 2220/20; A63B 2024/0028; A63B 2024/0043; A63B 2024/0025; A63B 71/022; A63B 2210/50; A63B 2220/10; A63B 2220/833; A63B 2220/40; A63B 2220/62; A63B 2220/803; A63B 2225/50; G04F 8/00; G01B 21/32
See application file for complete search history.

(56) References Cited

U.S. PATENT DOCUMENTS

| | | | | |
|---|---|---|---|---|
| 5,901,391 | A * | 5/1999 | Kato | A61N 5/0616 5/665 |
| 6,053,845 | A * | 4/2000 | Publicover | A63B 5/11 482/27 |
| 6,261,207 | B1 * | 7/2001 | Publicover | A63B 5/11 482/27 |
| 6,270,414 | B2 | 8/2001 | Roelofs | |
| 6,758,753 | B1 * | 7/2004 | Nagata | G10H 1/348 273/148 B |
| 7,297,089 | B2 | 11/2007 | Chen | |
| 8,206,266 | B2 | 6/2012 | Hall | |
| 2002/0137598 | A1 * | 9/2002 | Publicover | A63B 5/11 482/27 |
| 2004/0259689 | A1 * | 12/2004 | Wilkins | A63B 5/00 482/8 |
| 2005/0043122 | A1 * | 2/2005 | Publicover | A63B 5/11 473/465 |
| 2005/0113213 | A1 * | 5/2005 | Alexander | A63B 5/11 482/27 |
| 2005/0209053 | A1 * | 9/2005 | Knox | A63B 5/11 482/27 |
| 2006/0135320 | A1 * | 6/2006 | Chen | A63B 5/11 482/27 |
| 2006/0135321 | A1 * | 6/2006 | Chen | A63B 5/11 482/27 |
| 2008/0102424 | A1 | 5/2008 | Holljes | |
| 2010/0190608 | A1 | 7/2010 | Publicover et al. | |
| 2010/0240454 | A1 | 9/2010 | Xiao | |
| 2011/0034300 | A1 * | 2/2011 | Hall | A63B 5/11 482/1 |
| 2012/0077642 | A1 * | 3/2012 | Chen | A63B 5/11 482/27 |
| 2012/0139727 | A1 * | 6/2012 | Houvener | G08B 7/06 340/540 |
| 2012/0295763 | A1 * | 11/2012 | Lin | A63B 5/11 482/4 |
| 2013/0072269 | A1 * | 3/2013 | Chen | A63B 5/11 463/7 |
| 2014/0051550 | A1 * | 2/2014 | Chen | A63B 5/11 482/27 |
| 2015/0080186 | A1 | 3/2015 | Carlin et al. | |

FOREIGN PATENT DOCUMENTS

| | | |
|---|---|---|
| DE | 202011002605 | 10/2011 |
| WO | 2010105499 | 9/2010 |
| WO | 2012173503 | 12/2012 |

OTHER PUBLICATIONS

D. Eager et al., Characterisation of trampoline bounce using acceleration, 7th Australasian Congress on Applied Mechanics, ACAM 7, Adelaide, Australia, Dec. 9-12, 2012.

* cited by examiner

METHOD AND SYSTEM OF MEASURING AN ACTIVITY OF A PERSON ON A FLEXIBLE MAT OF A TRAMPOLINE

FIELD OF INVENTION

The invention relates to techniques and apparatus for measuring activity on a flexible mat of a trampoline. The invention particularly relates to techniques and apparatus for determining a bounce location of a person or an object on the flexible mat.

In another aspect the invention relates to game or other interactive apparatus for providing information and/or entertainment to a person based on activity of the person or an object on a flexible mat of the trampoline.

BACKGROUND

Canadian patent publication CA 2,772,801 to Yjip Inc describes a trampoline including a frame and a jumping mat assembly that is supported by the frame to allow at least one user to bounce on the jumping mat. The trampoline also includes a sensor system that includes a plurality of sensors supported by the frame and/or the jumping mat assembly. The sensors are used to determine the status of a user or users on the trampoline.

The plurality of sensors are typically spaced apart from each other. A single bouncing load of the user triggers multiple sensors simultaneously. The multiple sensors can output different signals depending on the spatial relationship between the bouncing load and the particular sensor. The signals from the multiple sensors are compared to provide a location of the user on the trampoline.

A potential drawback with the prior art is the inaccuracy or potential inaccuracy of determining a user location on the jumping mat. Where the user location is being used as input to a processor, it is necessary to have as accurate a location reading as possible.

The conventional trampoline described in YJIP incorporates a peripheral metal frame with the mat tensioned within the frame by extension springs spaced about the edge of the mat and extending outwards from the mat to the frame.

One drawback with the use of exposed springs, especially where they are in the plane of the mat, is that they reduce the surface area of the flexible mat. Furthermore the solid frame and exposed springs have the potential to present a hazard to a user, especially if the user is distracted by game apparatus providing information and/or entertainment while on the flexible mat.

It is an object of preferred embodiments of the present invention to address some of the aforementioned disadvantages. An additional or alternative object is to at least provide the public with a useful choice.

SUMMARY OF THE INVENTION

In broad terms in one aspect the invention comprises a method of measuring an activity of a person or an object on a flexible mat of a trampoline. The method comprises determining a mat deformation signal based at least partly on measurements from a sensor arrangement, the sensor arrangement comprising at least one sensor and defining a coordinate space for the mat, the or each sensor being configured to measure a value corresponding to a deformation of the mat as the person or object moves on the mat, wherein, when the person or object is on the mat, the value measured by the sensor or one of the sensors corresponds to a proximity of the person or object to the sensor; determining a bounce coordinate in the coordinate space based at least partly on the mat deformation signal; and determining a bounce location of the person or object on the mat based at least partly on the bounce coordinate in the coordinate space.

The term 'comprising' as used in this specification and claims means 'consisting at least in part of'. When interpreting statements in this specification and claims which include the term 'comprising', other features besides the features prefaced by this term in each statement can also be present. Related terms such as 'comprise' and 'comprised' are to be interpreted in similar manner.

Preferably the sensor arrangement comprises at least two pairs of sensors arranged around the mat.

Preferably the coordinate space is based at least partly on a geometry of the at least two pairs of sensors relative to each other.

Preferably the mat deformation signal is an average of measurements from the at least two pairs of sensors.

Preferably the coordinate space is a Cartesian coordinate space, and the at least two pairs of sensors define orthogonal axes of the Cartesian coordinate space.

Preferably the at least two pairs of sensors define orthogonal axes that are aligned with a weave of the flexible mat.

Preferably the at least two pairs of sensors define orthogonal axes that are offset with respect to a long axis of the flexible mat.

Preferably the sensor arrangement comprises at least three sensors arranged around the mat.

Preferably the mat deformation signal is indicative of when the person or object departs the mat for a bounce and indicative of when the person or object impacts the mat from a bounce.

Preferably the method further comprises determining a departure time when the person or object departs the mat; determining an impact time when the person or object impacts the mat; and determining a bounce interval during when the person or object is on the mat, the bounce interval based at least partly on a difference between the impact time and the departure time.

Preferably the bounce coordinate for the person or object on the mat is determined during at least part of the bounce interval, and after the mat deformation signal crosses a threshold.

Preferably the threshold is determined based at least partly on measurements from the sensor(s) when the user or object is not on the mat and when the mat is not deformed.

Preferably the bounce coordinate is determined between a time when the mat deformation signal exceeds the threshold and the departure time.

Preferably the method further comprises determining a flight interval when a user bounces off the mat, the flight interval based at least partly on a difference between the departure time and the impact time.

Preferably the method further comprises determining a bounce height of a person or object based at least partly on the flight interval.

Preferably the method further comprises determining a time of flight of the person or object based at least partly on the flight interval.

Preferably the method further comprises calculating respective sum of squared values for the sensor or at least one of the sensors during at least part of the bounce interval; and normalising the sum(s) of squared values to determine the bounce coordinate.

Preferably the sensor arrangement comprises four sensors, and normalising the sum(s) of squared sample values comprises calculating respective normalised sum ŝ values for one or more sums of squared sample values using the formula:

$$\hat{s}_a = \frac{n}{2} \times \frac{s_a}{s_1 + s_2 + s_3 + s_4} \text{ for } a = 1 \ldots 4$$

where n refers to the size of the coordinate space to be used to represent bounce location, a identifies the sensors; and s represents the sum of squared sample values for the one or more sensors.

Preferably the sensor arrangement comprises four sensors and normalising the sum(s) of squared sample values comprises calculating respective normalised sum ŝ values or one or more sums of squared sample values using the formula:

$$\hat{s}_a = \frac{n}{2} \times \frac{s_a}{s_1 + s_2} \text{ for } a = 1, 2$$

$$\hat{s}_a = \frac{n}{2} \times \frac{s_a}{s_3 + s_4} \text{ for } a = 3, 4$$

where n refers to the size of the coordinate space to be used to represent bounce location, a identifies the sensors; and s represents the sum of squared sample values for the one or more sensors.

Preferably sensors $s_1$ and $s_2$ comprise a first pair of sensors defining a first axis across the jumping mat, and sensors $s_3$ and $s_4$ comprise a second pair of sensors defining a second axis across the jumping mat transverse to the first axis.

Preferably the coordinate space is a Cartesian coordinate space, the bounce coordinate in the Cartesian coordinate space determined using the formula:

$$(x, y) = (\hat{s}_2 - \hat{s}_2, \hat{s}_4 - \hat{s}_3).$$

Preferably the method further comprises maintaining one or more trained bounce locations, the trained bounce location(s) recorded from one or more bounces on a single location on the jumping mat.

Preferably determining a bounce location comprises identifying the closest trained trained bounce location to the bounce coordinate.

Preferably the sensor arrangement is in communication with a display system, and the bounce coordinate is used as a controller for the display screen.

In a further aspect the invention comprises a trampoline comprising a flexible mat; a plurality of resiliently flexible rods each having a lower end retained by a frame of the trampoline and an upper end; one or more fittings coupled to the mat about a periphery of the mat, the fittings adapted to receive respective upper ends of the flexible rods; and a sensor arrangement comprising at least one sensor, the or each sensor configured to indicate activity of a person or object on the mat.

Preferably at least one of the fittings includes the at least one sensor.

Preferably the at least one sensor is fixedly mounted to the at least one fitting.

Preferably the at least one sensor is removably mounted to the at least one fitting.

Preferably the plurality of resiliently flexible rods have an approximately rectangular cross-section between the frame and the mat, the free length of the support rods between the upper ends and lower ends bowing outwards and curving upwards from the frame towards the mat substantially perpendicular to the frame to hold the mat in tension above the frame.

Preferably the sensor arrangement is configured to measure a value corresponding to a deformation of the mat as the person or object moves on the mat.

In a further aspect the invention comprises an interactive apparatus comprising the trampoline as described herein; a processor configured to receive as input data representing activity of a person or object on the flexible mat of the trampoline; and a display in communication with the processor, the display configured to display information and/or entertainment to the person based at least partly on the activity of the person or object on the flexible mat.

Preferably the apparatus further comprises a mounting arrangement comprising a flexible rod having a lower end adapted to be mounted to at least one of the resiliently flexible rods and having an upper end adapted to support the processor and/or display.

As used herein the term "and/or" means "and" or "or", or both.

As used herein "(s)" following a noun means the plural and/or singular forms of the noun.

BRIEF DESCRIPTION OF THE DRAWINGS

Preferred forms of the techniques for measuring activity on a flexible mat of the trampoline and associated apparatus are described with reference to the accompanying drawings by way of example and without intending to be limiting, wherein.

DETAILED DESCRIPTION OF PREFERRED FORMS

Figure 1:
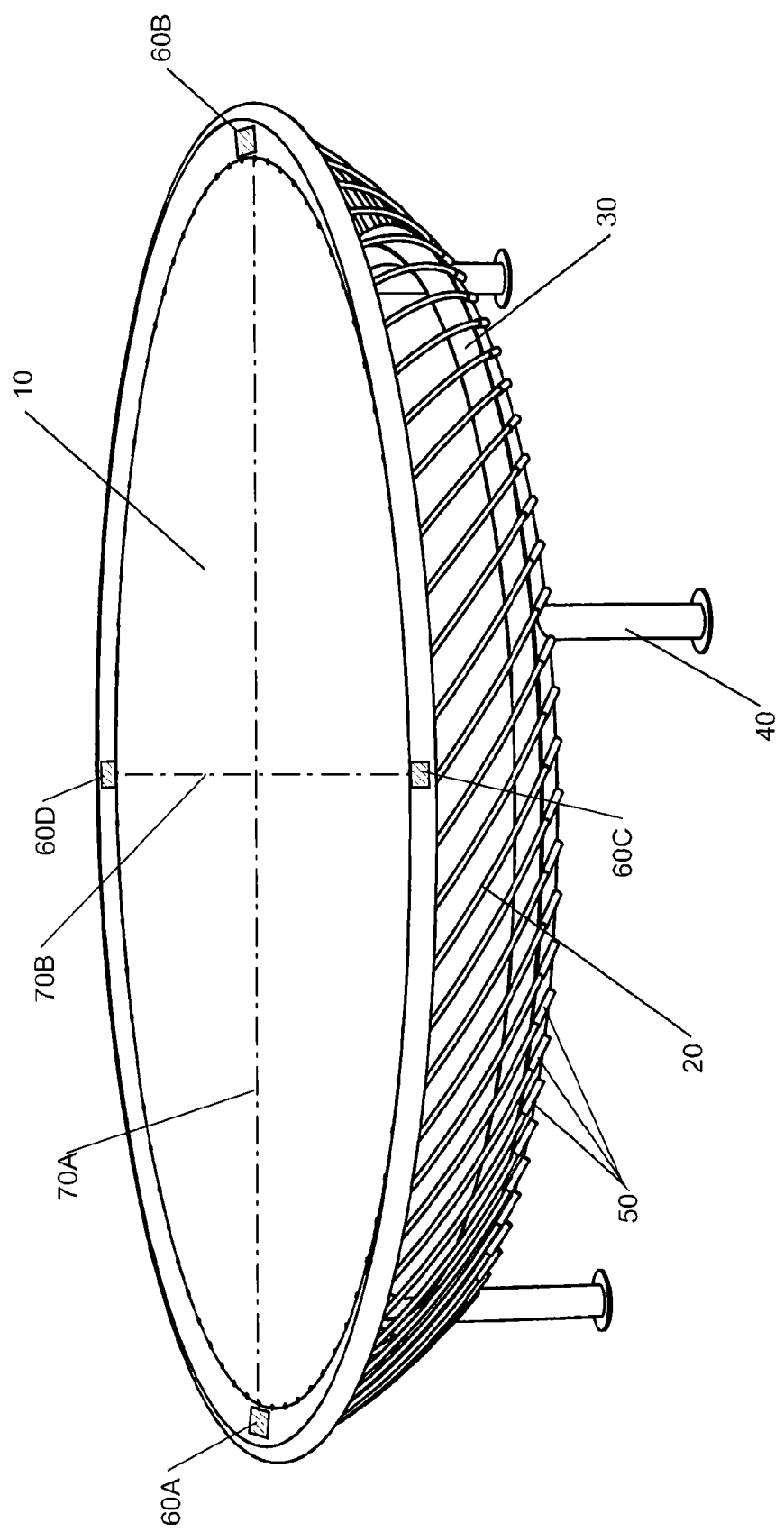
FIG. 1 is a perspective view of a preferred form trampoline for which a bounce location is desired.

FIG. 1 shows a preferred form trampoline for which bounce locations are desired. The preferred form trampoline comprises a flexible mat 10 on which a person may bounce, cause an object to bounce, or both. The trampoline further comprises a plurality of resiliently flexible rods 20 and a base frame that includes a circular beam 30 typically formed of steel or aluminium and supported from the ground by legs 40.

The rods 20 are typically fibreglass rods but may alternatively be formed of spring steel for example. The lower ends of the rods are retained by the circular beam 30. The upper ends of the rods connected to fittings as will be further described below. These fittings are coupled to the mat 10 about the periphery of the mat.

In a preferred form the lower ends of the rods 20 enter into tubular holders 50 fixed to the circular beam 30 as shown. Alternatively the lower ends of the rods are coupled to the circular beam 30 or a base frame of the trampoline of any other form.

The preferred form trampoline includes a sensor arrangement. The sensor arrangement comprises at least one sensor. As shown in FIG. 1, a preferred form sensor arrangement comprises two pairs of accelerometers. These accelerometers are shown at 60A, 60B, 60C and 60D. The four sensors 60 are shown as two pairs of sensors arranged around the mat. One pair of sensors 60A and 60B define an axis 70A across the mat. Sensors 60C and 60D define an axis 70B across the mat. As shown in FIG. 1, where there are two pairs of sensors, the pairs of sensors define orthogonal axes across the flexible mat 10.

In an embodiment the preferred form sensor arrangement comprises three or more sensors. In this embodiment the sensors are not necessarily provided as pairs of sensors arranged around the mat.

As will be described below, the sensor or sensors 60 are configured to measure a value corresponding to a deformation of the mat 10 as a person or object moves on or otherwise interacts with the mat. The value measured by the sensor(s) 60 corresponds to a proximity of the person or object to the sensor(s).

The term 'deformation' as used in this specification and claims in relation to a mat deformation signal or value includes displacement, velocity and/or acceleration of the mat edge.

It is envisaged that there are several suitable techniques for fixedly or removably mounting the sensors 60 in association with the trampoline. These preferred form methods of mounting will be further described below.

Determining a Mat Deformation Signal

FIGS. 2 to 5 illustrate a preferred form analysis of the readings of the sensor arrangement 60 associated with a person bouncing on the flexible mat 10.

Figure 2:
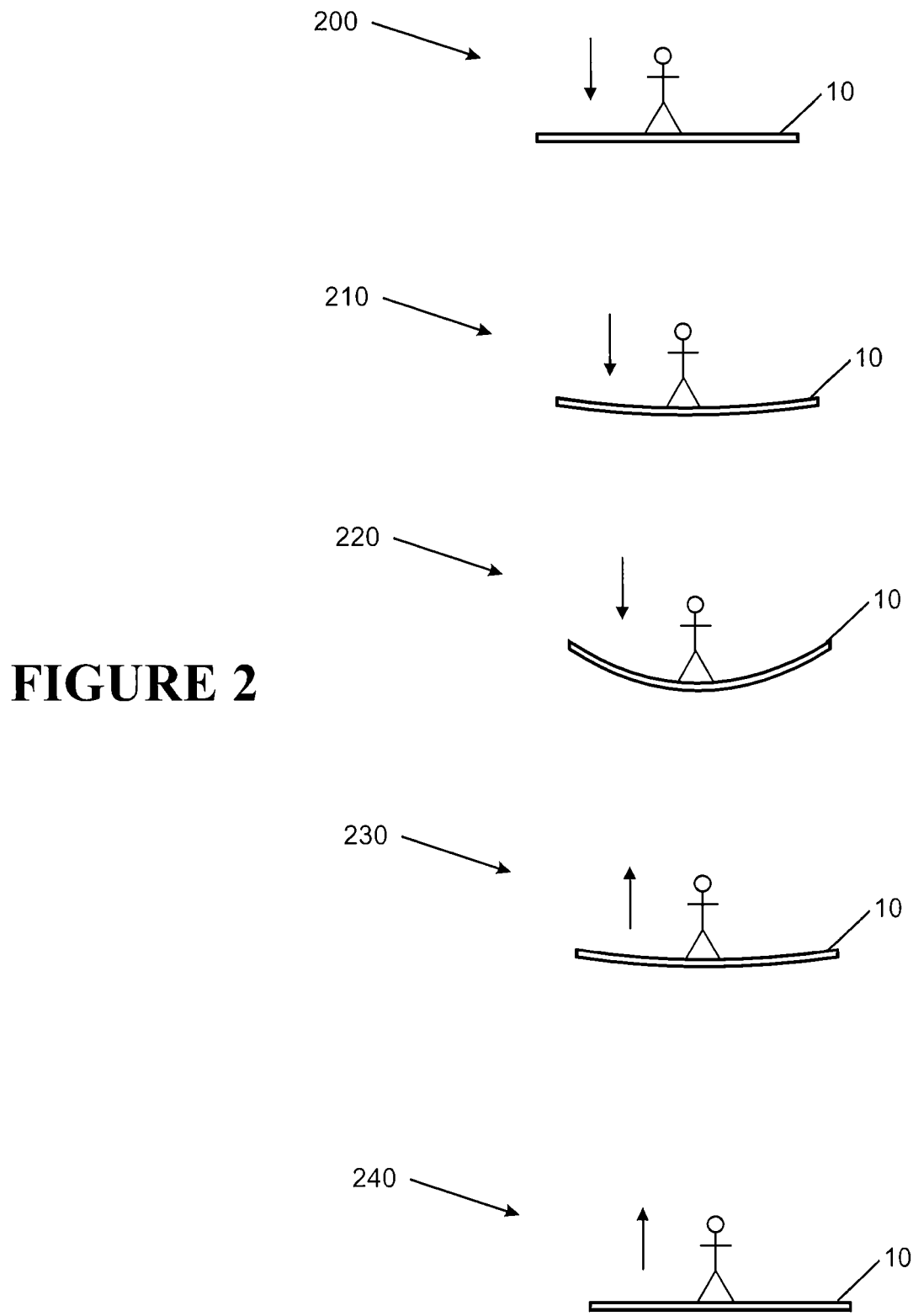
FIG. 2 shows a representation of 5 points during a person's bounce.

FIG. 2 shows an impact time 200. The impact time is the time when the person first contacts the flexible mat 10.

At point 210 the user remains in contact with the flexible mat 10. The force exerted on the flexible mat is caused by the person's weight while standing stationary on the mat.

Point 220 represents a point at the nadir of the person's bounce on the flexible mat 10.

At point 230 the force on the flexible mat 10 is once again equivalent to the person standing stationary on the mat. At point 230 the person is travelling upward, but still exerting a force on the mat.

Departure time 240 shows the user on an upward bounce leaving the flexible mat 10.

The sensor arrangement comprising sensor(s) 60 are preferably sampled at 400 Hz in axes 70A and 70B respectively. Acceleration is measured at 14-bit resolution with a plus or minus 8 g range, where one g is the acceleration due to gravity at the Earth's surface.

Preferably the received data is passed through a low pass filter to remove any unwanted high frequency noise. Furthermore, a low order high pass filter can be used to remove the offset produced by the resting angle(s) of the sensor(s).

Figure 3:
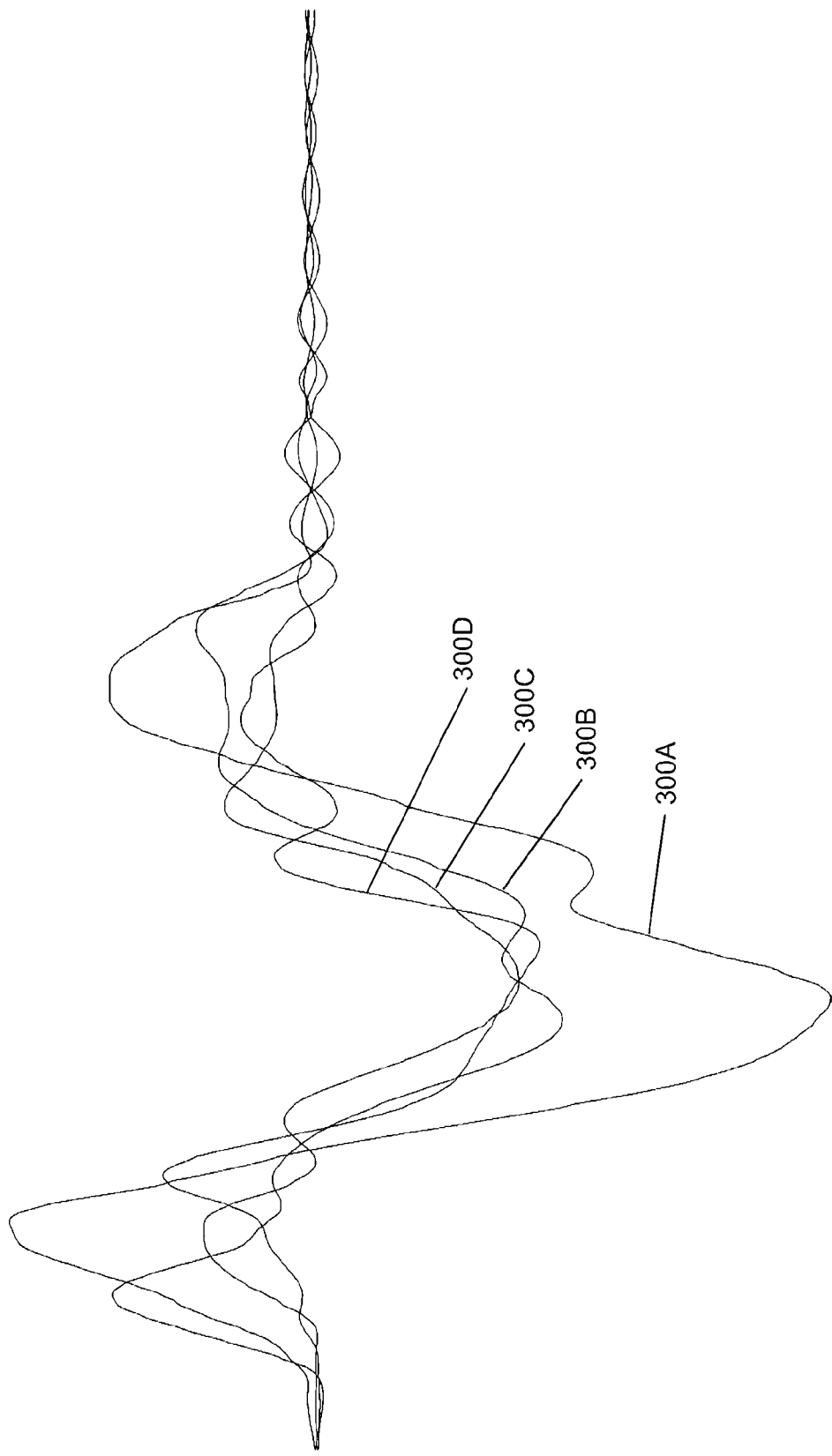
FIG. 3 shows a typical bounce signal received from the four sensors after filtering.

FIG. 3 shows a typical bounce signal received from the four sensors 60 after filtering. Shown in FIG. 3 are four traces representing the response of four different sensors 60. The points represent individual samples. The four traces are shown at 300A, 300B, 300C and 300D. These traces 300A-D are examples of the filtered readings that can be obtained from sensors 60A-D.

Figure 4:
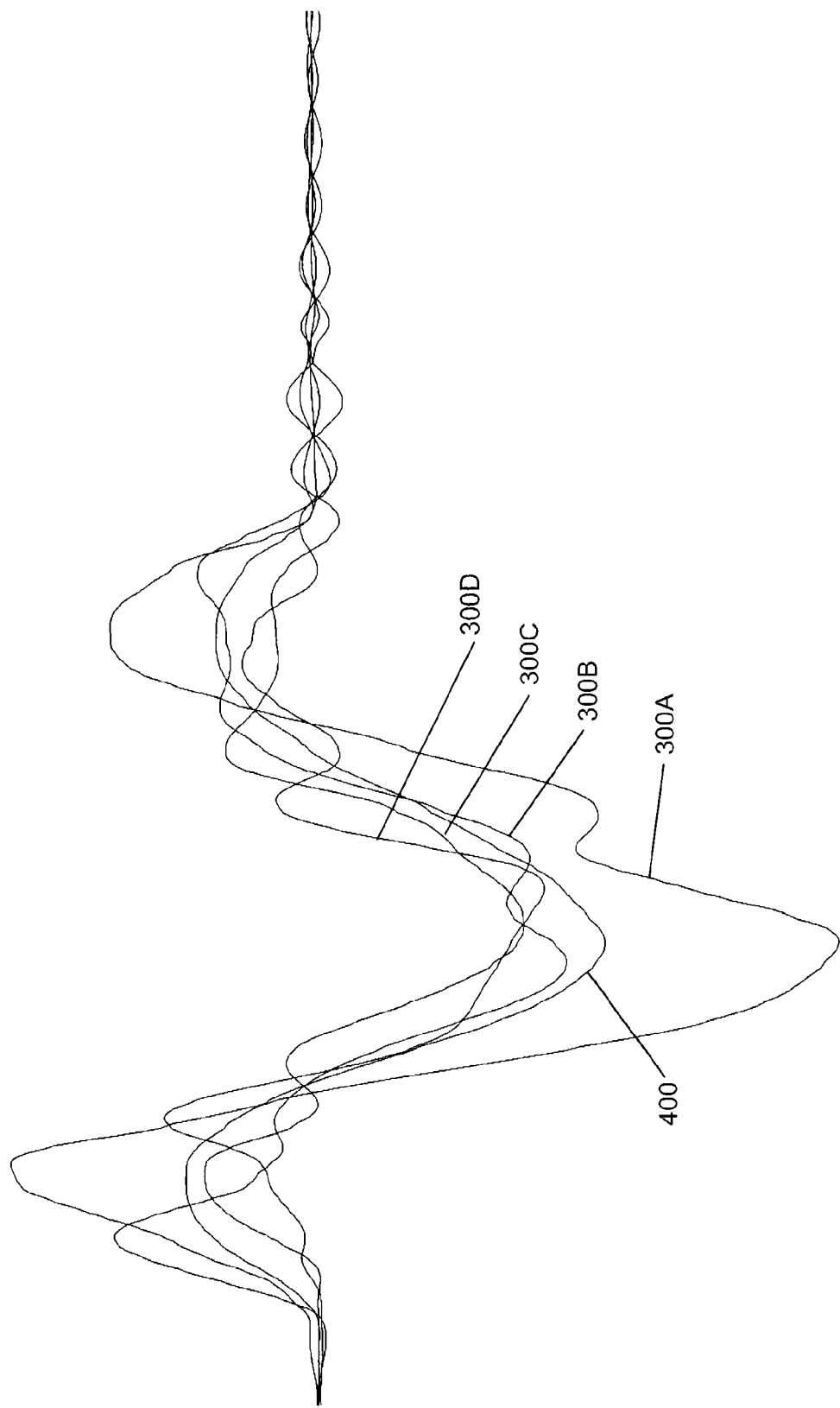
FIG. 4 shows the four signals from FIG. 3 and a clean signal obtained by taking an average of the four signals.

Preferably a clean signal is obtained at least partly from signals 300A-D. FIG. 4 shows a clean signal 400 preferably obtained by taking the average of the four signals 300A-D. The benefit of taking the average is that this cancels out the high frequency signal by destructive interference. The clean signal referred to subsequently as $\mu$ is then used for time based measurements.

Figure 5:
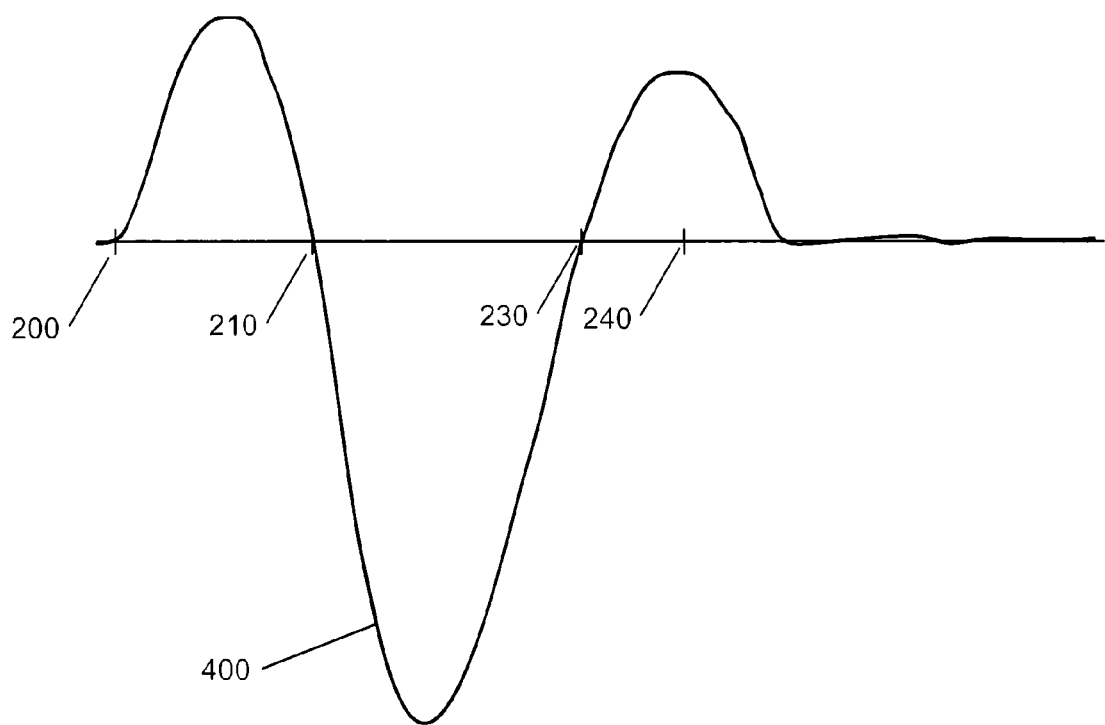
FIG. 5 shows solely the clean signal.

As shown in FIG. 5, the impact 200 time described above is when the person first contacts the flexible mat 10 at the start of a bounce. This impact time 200 is identified when $\mu$ first crosses a set threshold slightly above zero after a period of time spent below the threshold while the person is airborne.

Point 210 is identified from the time when the $\mu$ signal falls below a predetermined threshold. This is also referred to as the falling edge zero crossing. This predetermined threshold value is preferably zero.

Point 230 is identified when the $\mu$ signal rises above a predetermined threshold. This is also referred to as the rising edge zero crossing. This predetermined threshold value is preferably zero.

Departure time 240 is indicated as the local maximum point in the $\mu$ signal after the rising edge zero crossing 230.

In one preferred form the impact time 200 and the departure time 240 are used for calculating the time of flight and for estimating bounce height. The impact time and the departure time define a bounce interval. Within the bounce interval is an interval of interest between point 210 and point 230.

Alternatively or additionally the amount of energy expended, or calories burned, by the person is calculated.

Determining a Bounce Coordinate

The process described above with reference to FIGS. 2 to 5 is a preferred form method for determining a mat deformation signal based at least partly on measurements from a sensor arrangement. It is possible to determine a bounce coordinate based at least partly on the mat deformation signal. It is then possible to determine a bounce location of a person or object on the mat based at least partly on a bounce coordinate in a coordinate space.

The preferred form technique comprises calculating the sum of squared sample values for each sensor 60 during at least part of the interval of interest between point 210 and point 230.

The final summations of squared samples are preferably normalised using one or more of the normalisation techniques described below. This process gives different representations of the bounce location on a Cartesian plane.

In one preferred form, normalising the sum(s) of squared sample values comprises calculating respective normalised sum(s) ŝ values for one or more sums of squared sample values using the formula $$\hat{s}_a = \frac{n}{2} \times \frac{s_a}{s_1 + s_2 + s_3 + s_4} \text{ for } a = 1 \ldots 4$$

In the above formula the value n refers to the size of the coordinate space to be used to represent bounce location. The value a identifies the sensors and the value s represents the sum of squared sample values for the one or more sensors.

In the above formula the sensors identified by a are labelled such that sensor 1 corresponds to 60A, sensor 2 corresponds to 60B, sensor 3 corresponds to 60C and sensor 4 corresponds to 60D.

In one preferred form the sensors $s_1$ and $s_2$ comprise a first pair of sensors 60A and 60B defining a first axis across the flexible mat. Sensors $s_3$ and $s_4$ comprise a second pair of sensors 60C and 60D defining a second axis across the flexible mat transverse to the first axis.

In the case where the coordinate space is a Cartesian coordinate space, the bounce coordinate in the Cartesian coordinate space is determined using the formula $$(x,y) = (\hat{s}_2 - \hat{s}_1, \hat{s}_4 - \hat{s}_3).$$

The above normalisation approach favours the axis with the strongest signal. It has the potential to produce accurate locations when the bounce is in line with the sensor(s). However, in some cases it does not clearly separate bounces around the outer edges of the trampoline.

An alternative normalisation technique is to normalise against the opposite sensor. Normalising the sum(s) of squared sample values comprises calculating respective normalised sum(s) ŝ values for one or more sums of squared sample values using the formula $$\hat{s}_a = \frac{n}{2} \times \frac{s_a}{s_1 + s_2} \text{ for } a = 1, 2$$

$$\hat{s}_a = \frac{n}{2} \times \frac{s_a}{s_3 + s_4} \text{ for } a = 3, 4$$

In the above formula the value n refers to the size of the coordinate space to be used to represent bounce location. The value a identifies the sensors. The value s represents the sum of squared sample values for the one or more sensors.

The bounce location is again found by the formula:

$$(x,y) = (\hat{s}_2 - \hat{s}_1, \hat{s}_4 - \hat{s}_3).$$

This second normalisation technique has the potential to give equal weighting to each axis which helps spread out the reported locations in the corners of the trampoline. However it has the potential to produce unusual artifacts with bounces along the main axes.

Determining a Bounce Location

The techniques described above are preferred techniques for determining a bounce coordinate in the coordinate space based at least partly on the mat deformation signal. It is possible to determine a bounce of a person or object on the mat based at least partly on a bounce coordinate in a coordinate space.

One or more bounce locations or coordinates in the coordinate space is/are associated with one or more regions on the flexible mat. The average bounce coordinate readings recorded from a plurality of bounces on a single location on the flexible mat is regarded as a 'trained' position. A mapping between a bounce coordinate in the coordinate space and bounce location on the flexible mat is determined by training a plurality of different locations on the flexible mat.

A bounce location on the flexible mat is identified by finding the closest trained location using one or both of the normalisation techniques described above.

In some cases an actual bounce location could be close to more than one bounce coordinate. Preferably such ambiguous locations are identified by observing the normalisation technique that is the most accurate in the given position. One preferred form technique comprises storing a truth table of possible ambiguous results and a bounce location that should be used in each circumstance.

Figure 6:
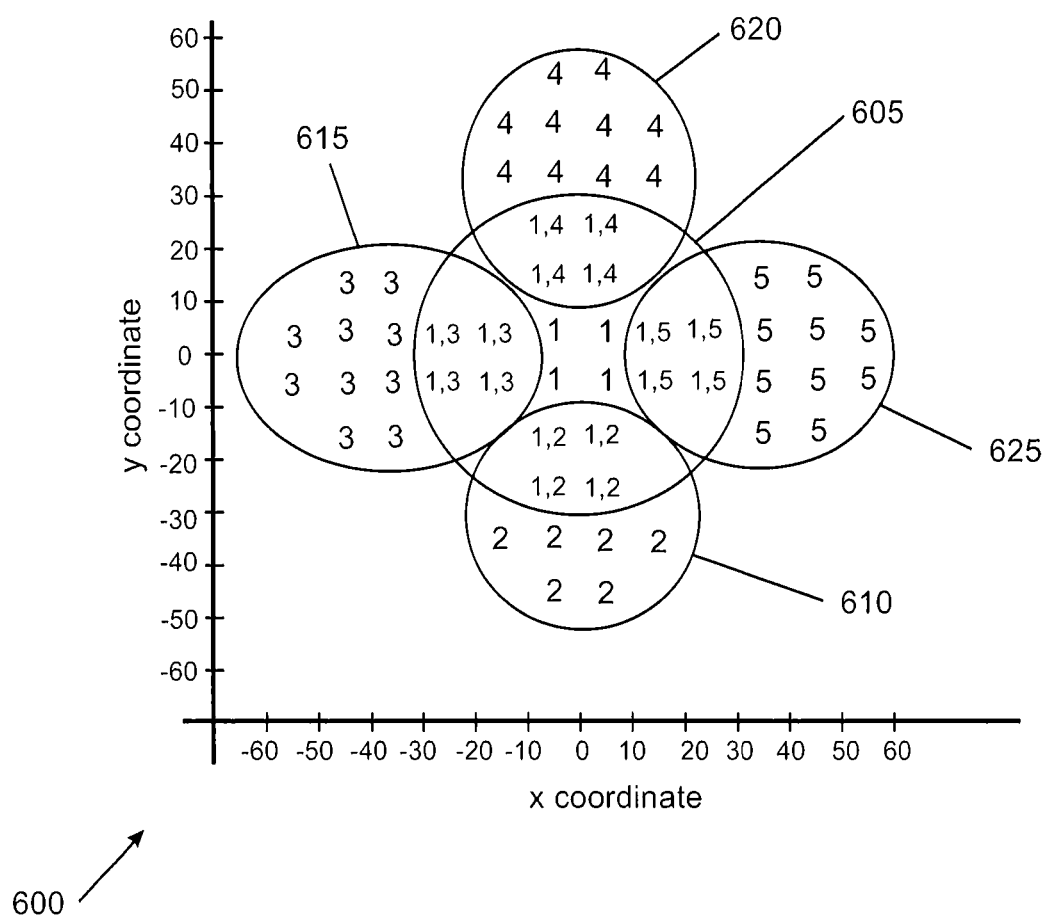
FIG. 6 shows a preferred form lookup table for five target bounce locations or zones.

FIG. 6 shows a preferred form lookup table 600 that is used to map locations on the Cartesian plane to the marked bounce zones on the flexible mat of the trampoline. As shown in FIG. 6, the preferred form lookup table 600 comprises a plurality of bounce locations in the Cartesian plane. These locations are preferably specified as (x,y) coordinates.

Lookup table 600 preferably contains target bounce locations or bounce zones for a plurality of bounce coordinates.

FIG. 6 shows 5 target bounce locations or bounce zones. These are indicated at 605, 610, 615, 620 and 625.

Final summations of squared samples are preferably normalised using one or more of the normalisation techniques described above. Preferably one or more normalisation techniques has a corresponding lookup table.

A bounce location for a single bounce is preferably determined by comparing the bounce coordinate locations identified by one or more of the normalisation techniques and their corresponding lookup tables. The most likely candidate of the candidates identified by the normalisation technique(s) is then selected. The lookup tables are preferably created by analysing sets of sample data representing bounces in each bounce location.

As shown in FIG. 6, some bounce coordinate locations map to more than one target bounce location or bounce zone. For example, there are 4 bounce coordinates shown that map to both bounce zone 605 and bounce zone 615. It is anticipated that such multiple target locations are disambiguated by determining the significantly strongest probability for each coordinate. For example, if a user has been directed to bounce in zone 615 and the resulting bounce coordinate maps to either zone 615 or zone 605, the most likely target zone is zone 615.

Figure 7:
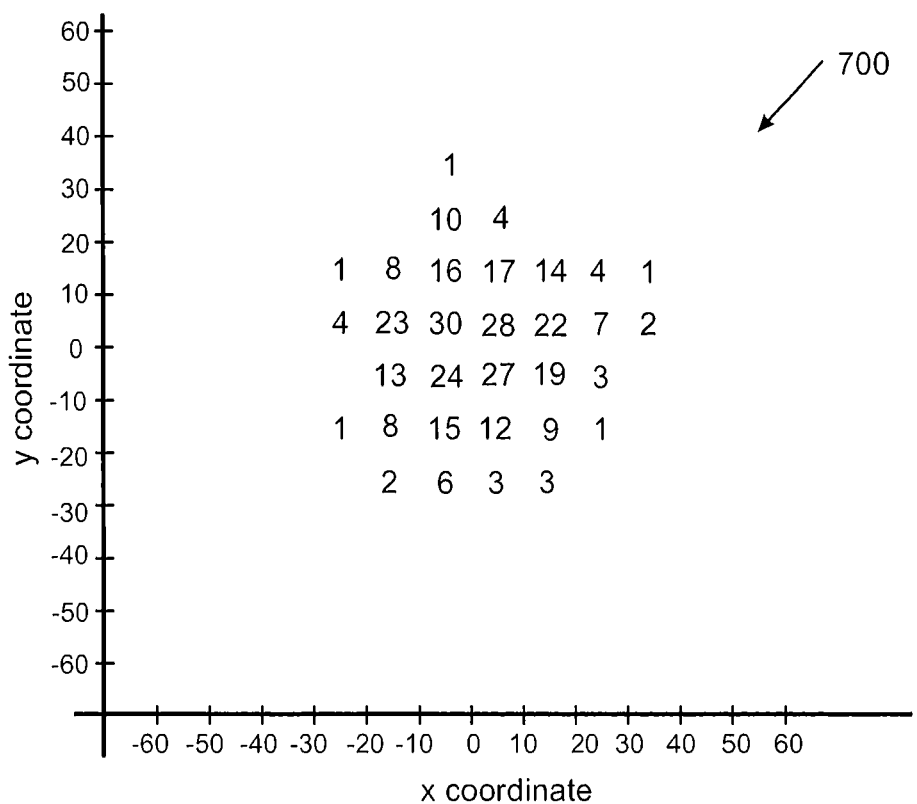
FIG. 7 shows a two dimensional array used to store bounce frequencies.

Described below is a preferred form process for creating lookup tables 600. As shown in FIG. 7, a two dimensional array 700 is used to store bounce frequencies.

The preferred form array 700 comprises a plurality of bounce locations in the Cartesian plane. These locations are preferably specified as (x,y) coordinates. FIG. 7 shows bounce frequencies for a central zone, for example zone 605 from FIG. 6.

It is anticipated that a given bounce coordinate and/or bounce location lie within a radius of a given target location on the flexible mat. Within array 700 there will be one or more elements within a given radius of a target location. Preferably the average value of these elements is determined and stored in a further array.

Preferably the above steps are repeated for increasing radii. Preferably each new radius results in a new array that is superimposed on other arrays created for various radii.

The resulting set of arrays are superimposed on each other and normalised against a number of bounces provided in the initial data set used to create array 700.

It is then possible to construct a probability density function. The function preferably shows a set of target bounce locations or bounce zones. Each of these target locations has a relative likelihood for one or more possible bounce coordinates.

Lookup table 600 is preferably determined by identifying a target bounce location or bounce zone having the significantly strongest probability for each coordinate in the Cartesian space. In some cases there may be no dominant zone for a given target bounce location. In this case multiple target locations are recorded as possible candidates for that coordinate.

There are several preferred form techniques for creating the sample data that is used to determine the array 700 and the lookup table 600 described above. One preferred form method is to instruct a person to bounce on a target location. A preferred form direction includes displaying a location on a computer display visible to the user.

The user is directed to bounce on a target location for a predetermined or instructed number of bounces. The user is then instructed to bounce on a new target bounce location for a further predetermined number of bounces. Where there are 5 target bounce locations, it is anticipated that a user will be directed to make 200 bounces or approximately 40 bounces in each target bounce location.

This technique is preferably presented to the user in the form of a game. The object of the game is for the user to try and land on a directed or highlighted target bounce location for every bounce. A final score is given representing the percentage of bounces where the determined bounce location matches the target bounce location.

The calculated Cartesian coordinates for one or more of the normalisation techniques described above are coupled with the target bounce location and stored in a computer memory to be used as the new sample data.

It is anticipated that the majority of bounces within a set of 200 bounces will land in a correct target location or within an acceptable radius of a target location. Bounces that do not land within an acceptable range of a target bounce location will presumably be sporadic enough that they will be discarded by an outlier threshold.

Mounting the Sensors

Figure 8:
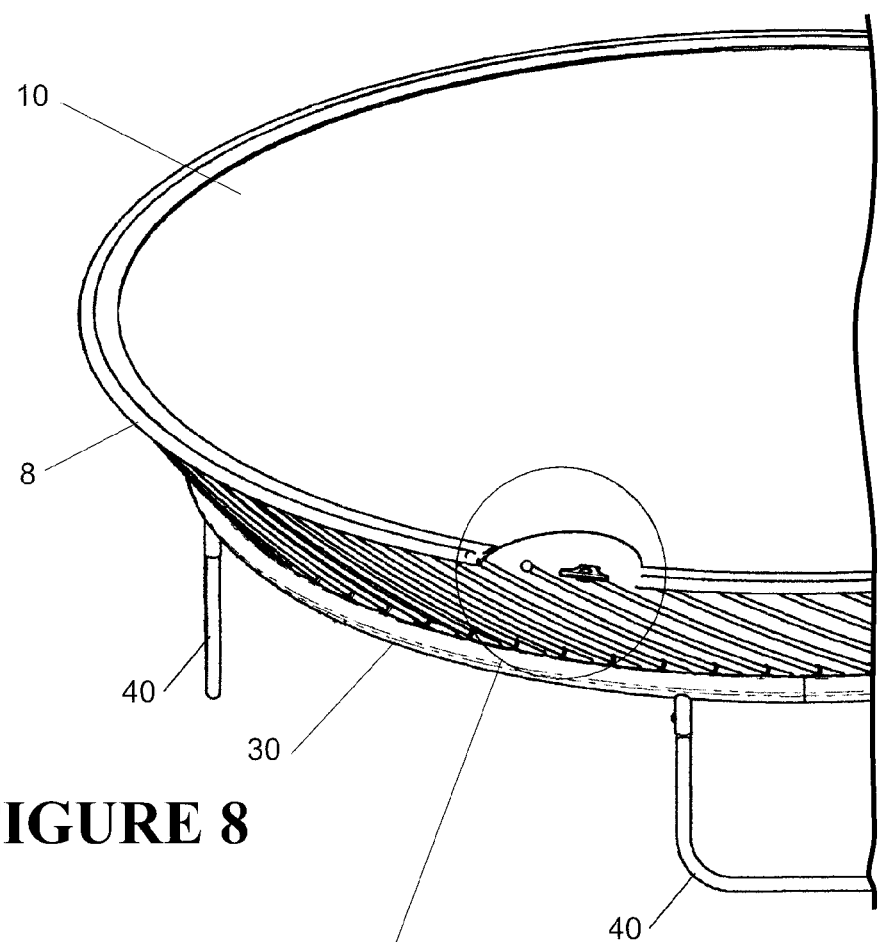
FIGS. 8 and 8A show a preferred form technique for mounting the sensors in association with the trampoline.
Figure 8A:
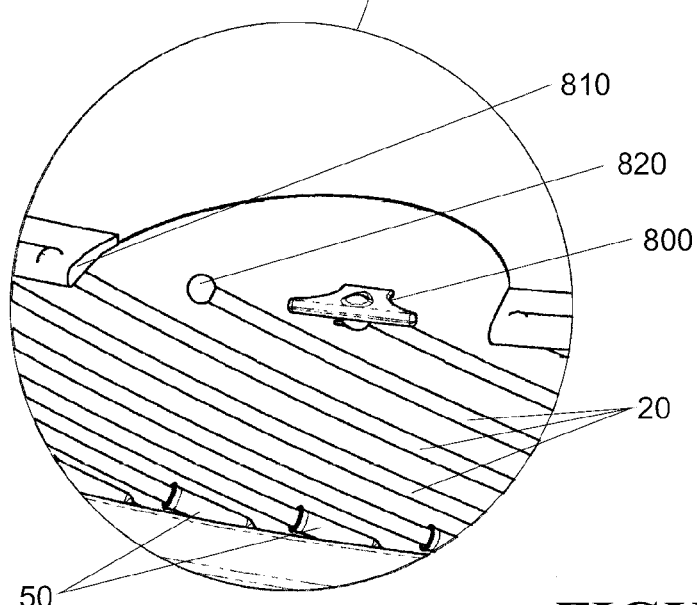

FIGS. 8 and 8A show a preferred form technique for mounting the sensors 60 in association with the trampoline. The preferred form trampoline comprises the flexible mat 10, a plurality of resiliently flexible rods 20 and the circular beam 30. The beam is typically formed of steel or aluminium and is supported from the ground by legs 40.

The lower ends of the rods are retained by the circular beam 30 and the upper ends of the rods connect to fittings 800 as will be further described. Fittings are coupled to the flexible mat 10 about the periphery of the mat. The lower ends of the resiliently flexible rods 20 enter into tubular holders 50 fixed to the circular beam 30 as shown. Alternatively the lower ends of the rods are coupled to the circular beam, or a base frame of the trampoline of any other form, in any suitable way.

The preferred form flexible mat 10 is typically heavy canvas or a woven synthetic material. It is preferably doubled back upon itself and fixed by stitching for example about the periphery of the mat to form a continuous pocket 810 extending about the periphery of the mat. A plurality of fittings 800 are positioned within this pocket 810 in the peripheral edge of the mat as shown in FIG. 8. The fittings in one form are loosely captured within the pocket. Alternatively the fittings are stitched to the mat within the edge pocket. In a further embodiment the fittings are mechanically fastened to the flexible mat 10 via rivets for example.

The preferred form fittings 800 have a genuinely planar body portion and a socket cavity defined on or in an underside of the body portion of the fitting. Typically the fittings will be formed from a plastics material by injection moulding for example. The preferred form fitting has a portion that extends downwardly from the underside of the fitting to define the socket cavity. The enlarged rod end 820 fits into the socket cavity as shown in FIG. 8A.

In a preferred form the part of the flexible mat 10 that is doubled back to define the pocket 810 in the peripheral edge of the mat wraps around the outer edges of the fittings 800 so that in use the outer edges of the fittings contact the inside surface of the pocket at its outer edge as shown. This arrangement assists in transferring forces between the fitting 800 and the flexible mat 10 or vice versa.

In an alternative form individual pockets are formed adjacent but spaced from the outermost peripheral edge of the mat. These pockets are defined by stitching through the mat to form the pockets which each receive and retain a fitting.

Alternatively again the fittings are stitched directly to the mat adjacent its outer edge, or mechanically fastened to the mat.

In use as the trampoline is bounced on by a user, this will cause pivotal movement between the upper ends 820 of the rods 20 and the fittings 800 coupled to the mat, to a greater or lesser extent depending upon the size and energy of the user. If the user bounces close to a part of the edge of the mat, significant movement of the enlarged rod ends 820 of the few rods closest to the point where the user bounces will pivot significantly within the socket cavities in the fittings 800.

One or more of the fittings 800 about the periphery of the mat includes at least one sensor 60. Sensor 60 is moulded into or fixedly or removably mounted to fitting 800. Movement of one or more of the fittings 800 that are associated with a sensor is detected by the respective sensor as a user bounces on the flexible mat.

Figure 9:
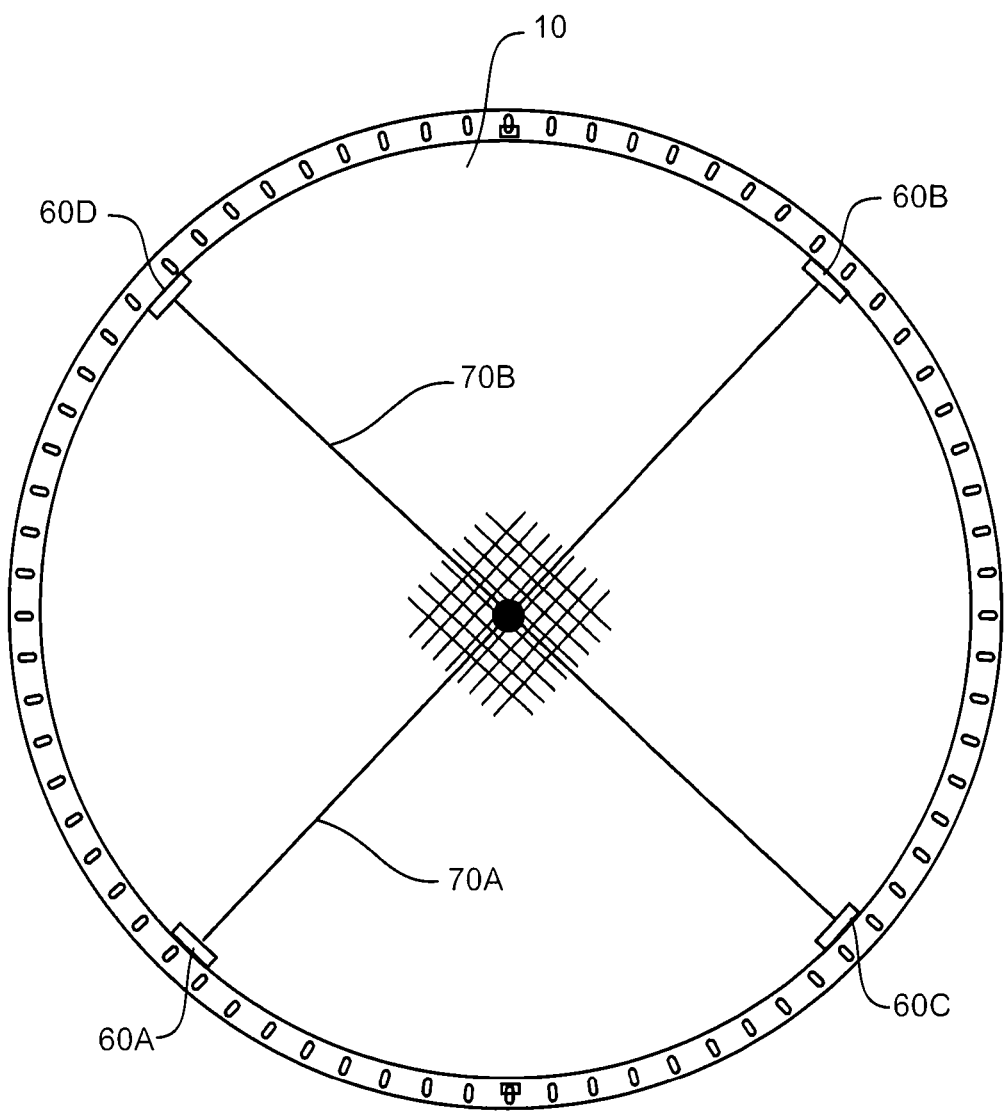
FIG. 9 shows a preferred form placement of sensors around a circular mat.

FIG. 9 shows a preferred form placement of pairs of sensors 60 around a circular mat 10. The sensors define orthogonal axes 70A and 70B that are each substantially parallel to the weave of the flexible mat.

Figure 10:
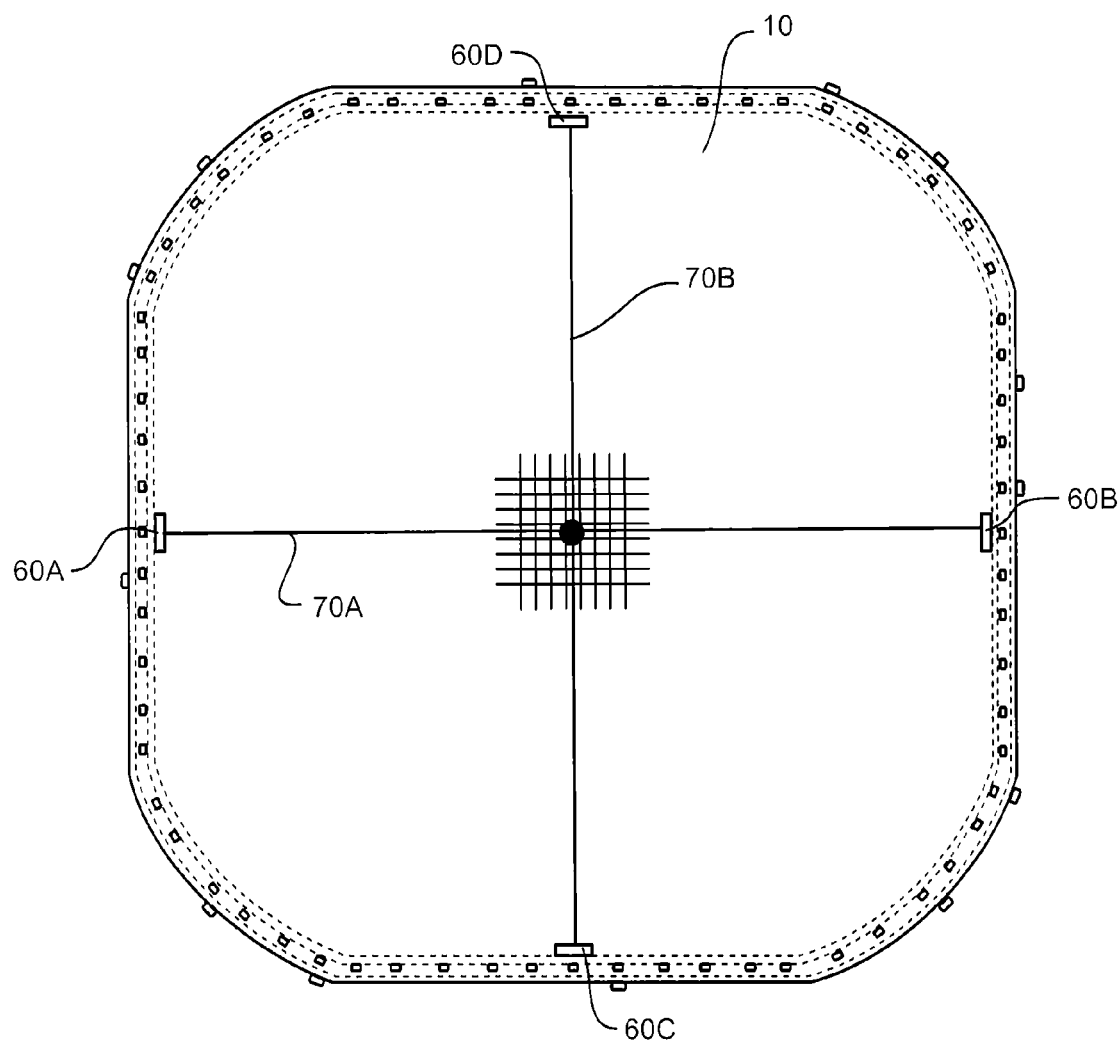
FIG. 10 shows a preferred form placement of sensors around a square mat.

FIG. 10 shows a preferred form placement of the pairs of sensors 60 around a square mat 10. Once again, the sensors define orthogonal axes 70A and 70B that are each substantially parallel to the weave of the flexible mat.

Figure 11:
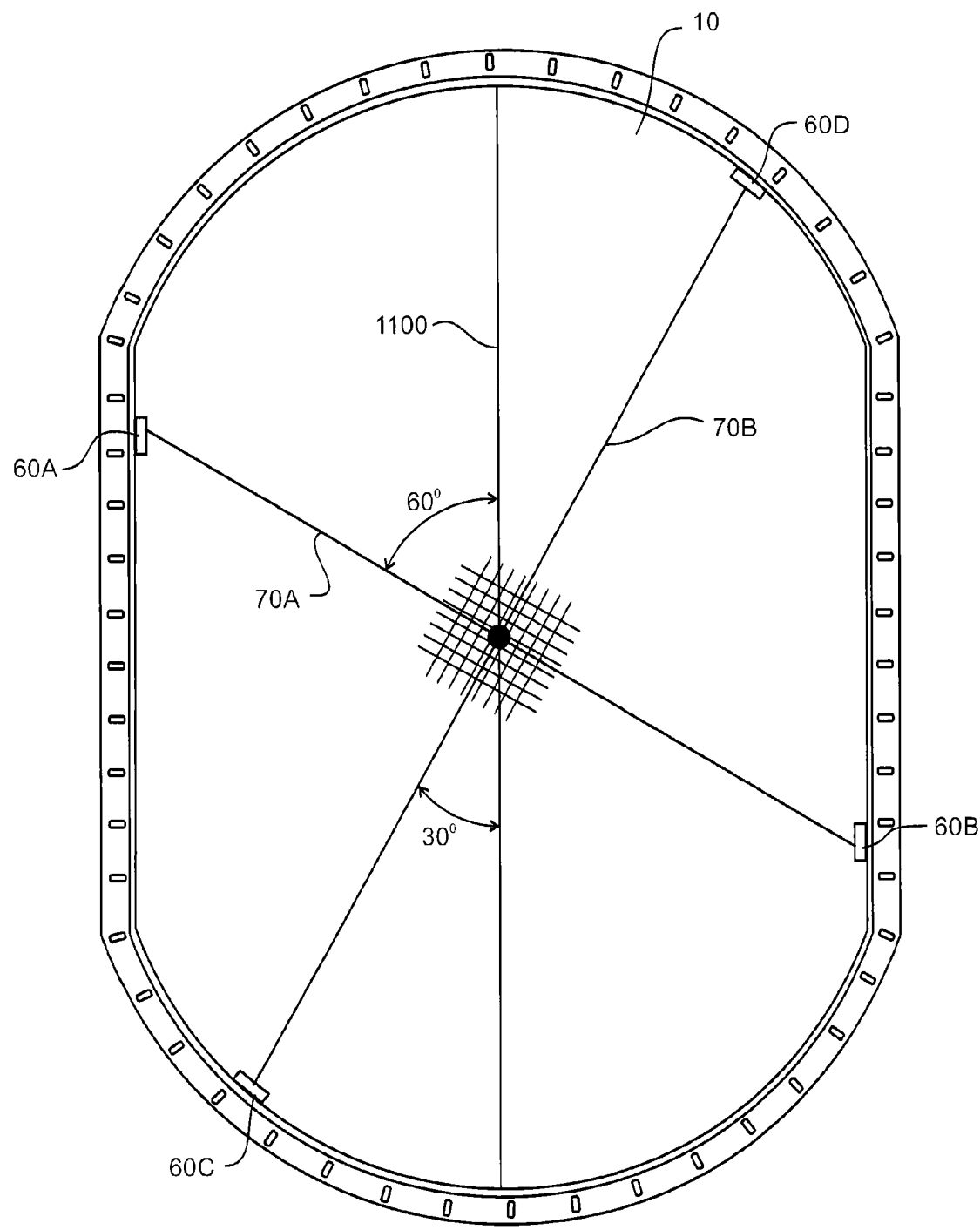
FIG. 11 shows a preferred form placement of sensors around an elliptical mat.

FIG. 11 shows a preferred form placement of the pairs of sensors 60 around an elliptical mat 10. The sensors define orthogonal axes 70A and 70B that are each offset with respect to a long axis 1100 of the flexible mat.

Axis 70A is preferably offset from axis 1100 by approximately 60°. Axis 70B is substantially orthogonal to axis 70A and is offset from axis 1100 by approximately 30°.

As can be seen in FIG. 11, both axes 70A and 70B are each substantially parallel to the weave of the flexible mat. Axis 1100 is offset from the weave of the mat.

Figure 12:
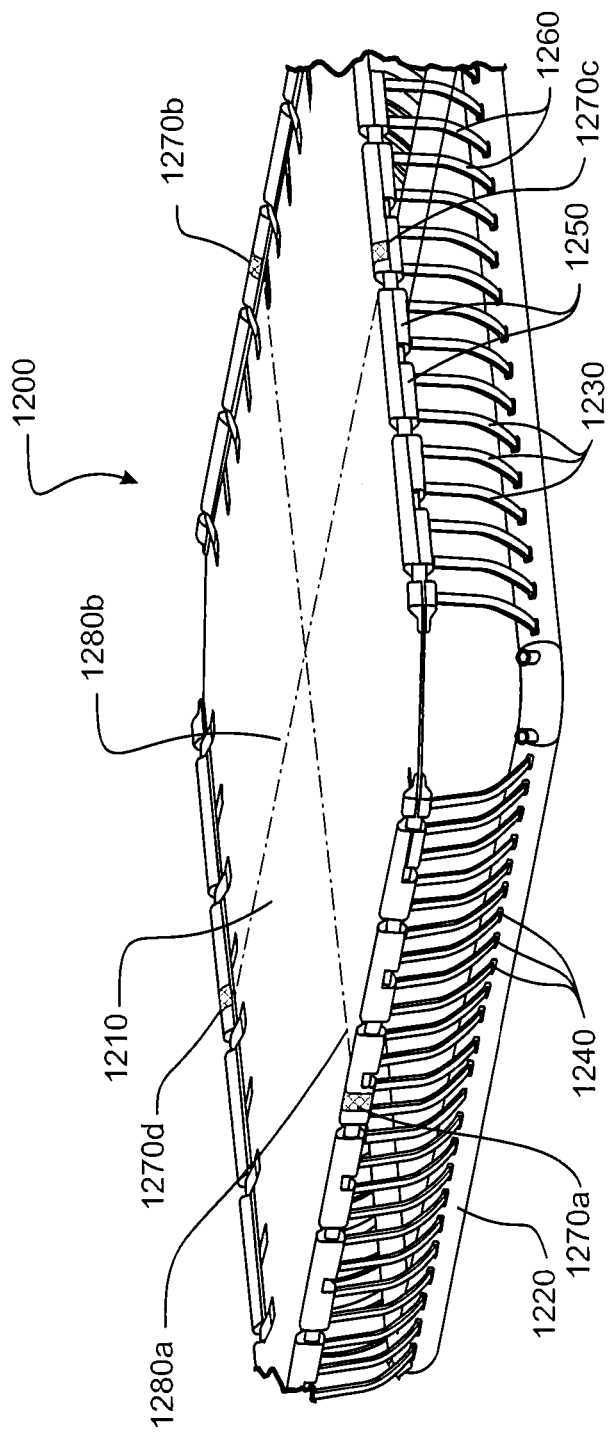
FIG. 12 is a perspective view of a further preferred form trampoline including a flexible mat, a plurality of resiliently flexible rods, and a sensor arrangement.

A further embodiment of a trampoline according to the invention is shown in FIG. 12. The trampoline 1200 has a flexible rebounding mat 1210 and a frame 1220, the mat 1210 and frame 1220 held in position relative to one another by a plurality of support rods 1230.

The frame 1220 of the preferred embodiment is generally rectangular in plan view, with a hollow centre. While the preferred form is rectangular, the frame 1220 could have any suitable shape, such as square, oval or circular.

The mat 1210 has the same shape as the frame 1220, but larger, so that when the mat 1210 is placed above the frame 1220, each edge of the mat 1210 overlaps the frame 1220. The mat 1210 is formed from a resiliently flexibly material such as woven polypropylene.

The mat 1210 is held above the frame 1220 in tension by a plurality of support rods 1230. Each of the support rods 1230 has a lower end 1240 which is connected to the frame 1220, and an upper end 1250 which is connected to the mat 1210.

In the preferred embodiment, the lower end 1240 is connected to the frame 1220 in such a manner that the lower end 1240 is angled outwards and upwards from the frame 1220, with the longitudinal axis of the support rod 1230 aligned substantially perpendicular to the longitudinal axis of the frame 1220.

Each support rod 1230 has a free length 1260, which is that length of the rod between the upper end 1250 (connected to the mat) and the lower end 1240 (connected to the frame). The free length 1260 bows, bends or extends outwards from the frame 1220 (more specifically, the hollow centre of the frame 1220) along the entirety of the free length to form an outwardly bowed arc.

The support rods 1230 are, in the preferred embodiment, formed from fibreglass or a similar material. The support rods 1230 are formed as flat bars—that is, elongate members with a square or more preferably rectangular cross-section.

The support rods 1230 are flat or straight when no external force is applied—that is, they are not pre-formed with a curve. The sides of the rods (that is, the narrower ones of the longer faces aligned along or with the longitudinal axis of the rod) are, in the preferred embodiment, fully radiused.

The rods 1230 form a row along each side of the frame 1220 and mat 1210. The corners of the trampoline do not have support rods associated with them. In the most preferred form, the corners of the rectangular mat 1210 are 'cut off' diagonally between the end one of each row of support rods, to avoid an unsupported or loose portion of material at the corner.

Trampoline 1200 includes a sensor arrangement similar to the arrangement described above in FIG. 1. The sensor arrangement comprises at least one sensor. As shown in FIG. 12, a preferred form sensor arrangement comprises two pairs of accelerometers. These accelerometers are shown at 1270a, 1270b, 1270c and 1270d. The four sensors 1270 are shown as two pairs of sensors arranged around the mat 1210.

One pair of sensors 1270a and 1270b define a line 1280a across the mat. Sensors 1270c and 1270d define a line 1280b across the mat. Where there are two pairs of sensors, the pairs of sensors preferably define orthogonal axes across the flexible mat 1210.

Figure 13A:
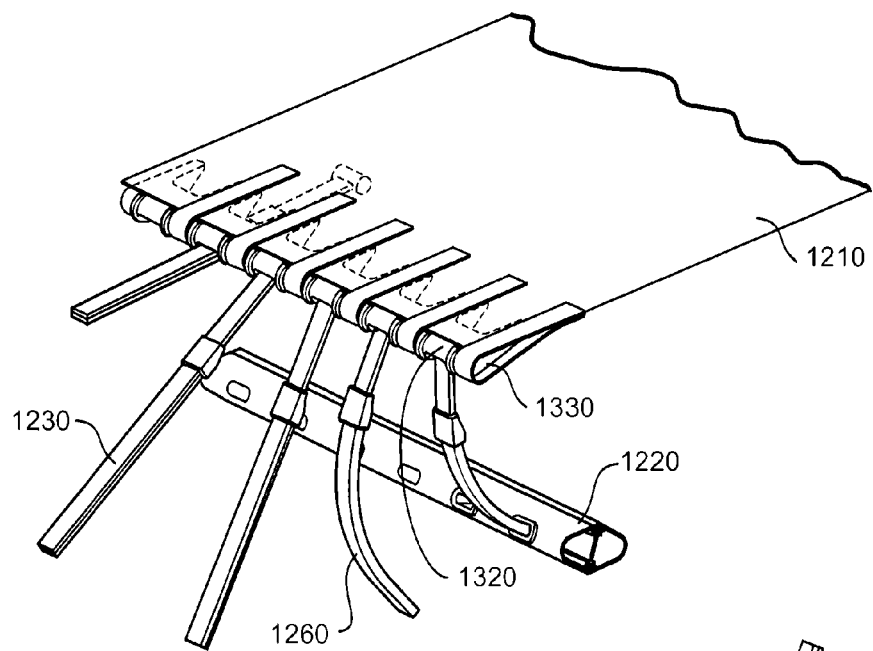
FIGS. 13A, 13B and 13C show a preferred form technique for mounting the sensors in association with the trampoline of FIG. 12.
Figure 13B:
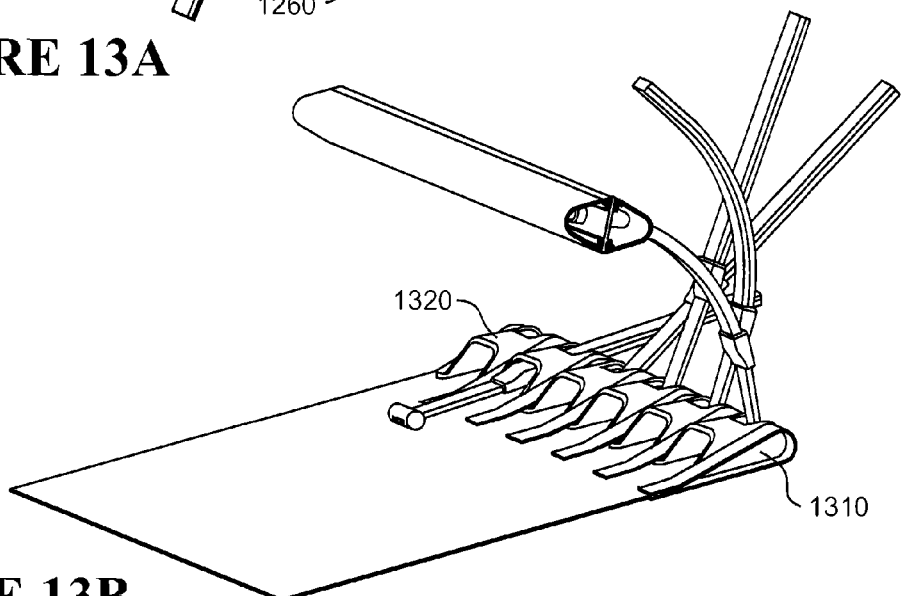
Figure 13C:
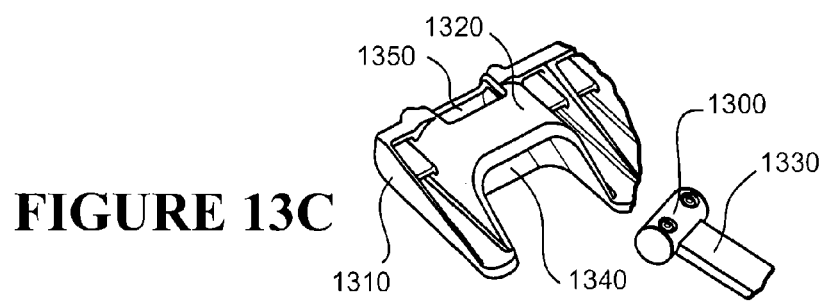

FIGS. 13A, 13B and 13C show preferred form edge connectors of the trampoline of FIG. 12. The edge connector 1300 is used as a part of a mechanism to connect the upper end of the support rod 1230 to the edge of the mat 1210. In the preferred form, the mat 1210 is fitted with a mat edge fitting or fittings which fit with or correspond to the edge connector 1300.

In the preferred form, the mat edge fittings are female connectors which correspond to the male edge connector 1300. The female connectors are ganged in a single unitary item which is then connected to the edge of the mat to form a row of multiple female connectors on the edge of the mat 1210. In the preferred form, the ganged female connectors are formed as a separate component to the mat 1210, and then connected to the edge of the mat 1210.

A first preferred way to connect the ganged female connectors is shown in FIGS. 13A-C. The ganged female connectors are formed as a single attachment component 1310 with the female connectors aligned in a row. Connector portions 1320 alternate with attachment portions 1330 in attachment component 1310. Each connector portion 1320 has a hollow elongate form with a rectangular opening 1340 aligned facing inwards towards the centre of the mat and an outwards-facing opening or outer opening 1350. The connector portions 1320 are interspersed with attachment portions 1310 in a 1:1 ratio.

As part of the assembly of the trampoline 1200, the lower end 1340 of the support rod 1230 is passed through the connector portions 1320 from the inside, extending out through the outer opening 1350. The upper end 1250 is fitted with the edge connector 1300. The connector portions 1320 and edge connector 1300 mutually fit together in such a way that the edge connector 1300 is held in position inside the connector portion 1320, but can rotate around an axis parallel to the edge of the mat 1310. The range of rotation is not required to be more than a few degrees each way in use.

Figure 14A:
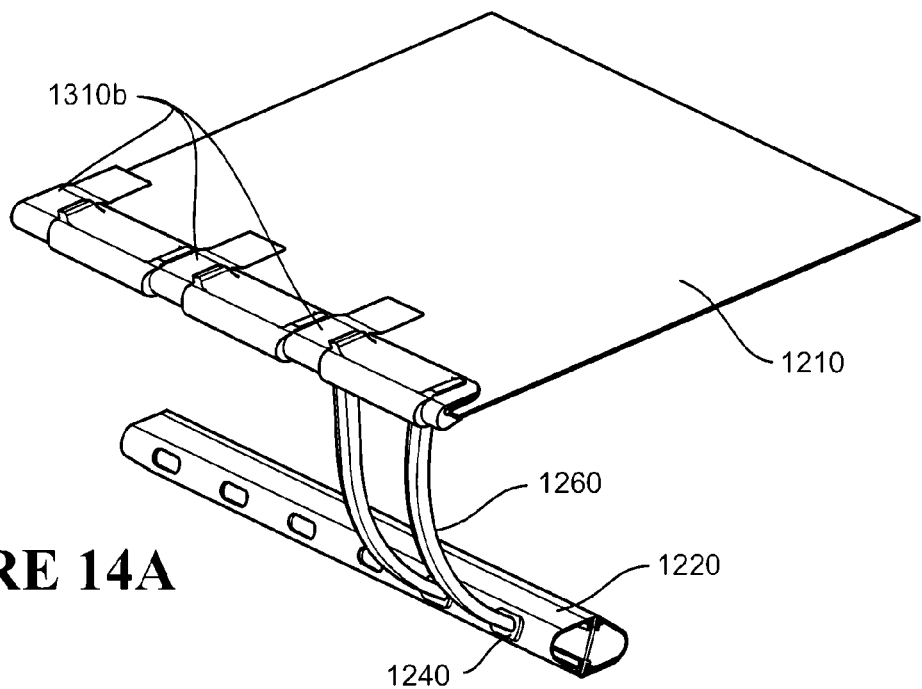
FIGS. 14A and 14B show a further preferred form technique for mounting the sensors in association with the trampoline of FIG. 12.
Figure 14B:
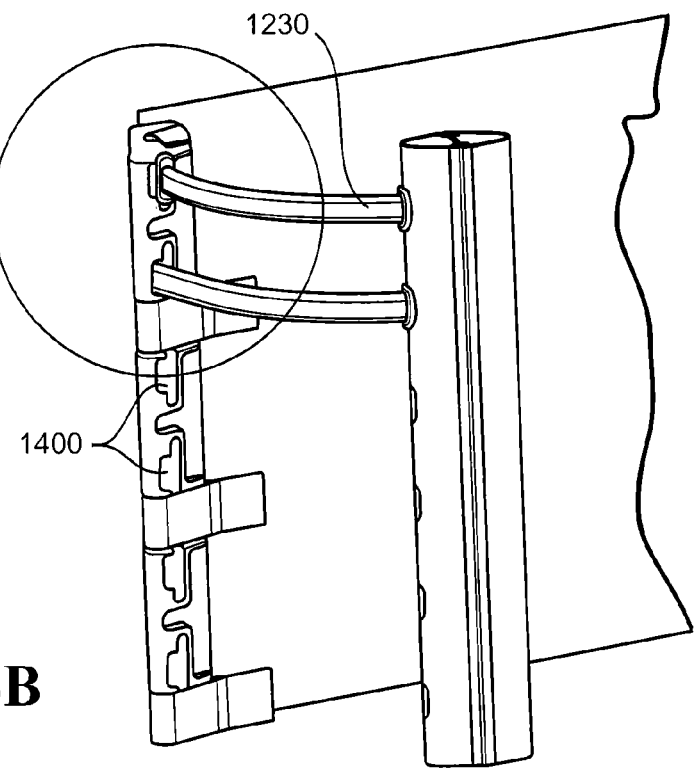

FIG. 14 shows an alternative attachment component 1310b. The attachment component 1310b is similar to the component 1310 described above. However, in this variant, the connector portions are interspersed with attachment portions in a 2:1 ratio. The 'female' component or connector portions of the attachment component are recesses 1400. The edge connector 1300 of FIG. 13C is fitted into the recess 1400 from below, and can rotate around an axis parallel to the edge of the mat in a similar manner to that described above. Also as above, the range of rotation is not required to be more than a few degrees each way in use.

The trampoline shown above in FIGS. 1 and 8 shows a plurality of fittings 200 in a 1:1 ratio with flexible rods 20. The trampoline shown in FIGS. 10, 11, and 12 shows a plurality of attachment components 1310 and attachment components 1310b. As shown in FIG. 12 some of the attachment components 1310 or 1310b are adapted to receive support rods 1230 in a 1:1 ratio. Other attachment components shown are adapted to receive support rods 1230 in a 1:2 ratio.

In a further preferred embodiment not shown in the drawings, the attachment component spans an edge of the mat 1210 with a plurality of support rods 1230 located within the attachment component. In other embodiments the attachment component spans more than one edge. In other embodiments the attachment component spans the entire periphery, or part of the periphery, of the mat 1210.

One or more of the attachment components 1310 of FIG. 13, the attachment components 1310b of FIG. 14, or other forms of the attachment components include at least one sensor.

Using Bounce Location as Input to a Processor

Figure 15:
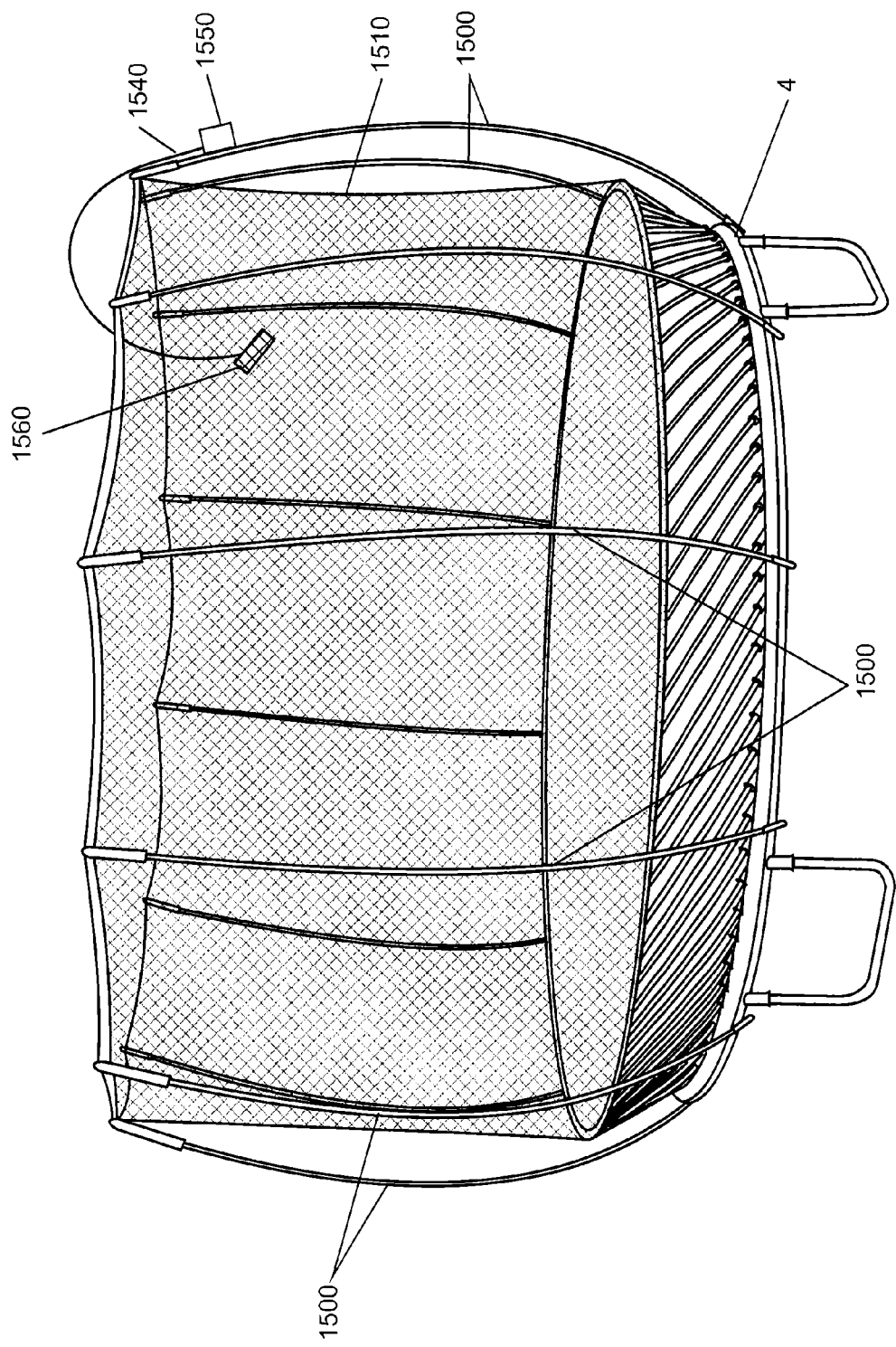
FIG. 15 shows a preferred form mounting arrangement for a handheld device.

FIG. 15 shows a preferred form trampoline that includes an enclosure system. The enclosure system consists of a plurality of resiliently flexible generally upright enclosure support members 1500 which in the preferred form are flexible or deformable fibreglass rods.

Enclosure support members 1500 are referred to below as enclosure rods for convenience but it is to be understood that this term is non limiting in relation to the size and cross-sectional shape of the enclosure support elements and the material from which they are formed.

The preferred form enclosure system also comprises a barrier net 1510. The enclosure rods 1500 support the net 1510 above the flexible mat. The lower edge of the barrier net 1510 is coupled directly or indirectly to the peripheral edge of the mat. Barrier net 1510 is typically formed of a lightweight but strong net material. Alternatively this could be a flexible fabric material which is for example opaque or which is perforated so as to be semi-opaque.

The enclosure rods 1500 are positioned on the outside of the net 1510 as shown. The enclosure rods are coupled to the circular beam 30 at the lower ends of the enclosure rods and to the upper peripheral part of the net 1510 at or towards the upper ends of the enclosure rods 1500.

Preferred form enclosures are more particularly described in our U.S. Pat. No. 7,708,667.

Where there is an enclosure provided as shown in FIG. 15, there is preferably provided a mounting arrangement comprising a flexible rod 1510. The flexible rod 1540 is fixedly or removably mounted at point 1550 to one or more of the enclosure rods 1500. The flexible rod 1540 is shaped and formed to enable a user to position at least part of the flexible rod 1540 within the barrier net 1510. Preferably the flexible rod 1540 is constructed so that it can be manipulated and configured yet retain a shape desired by the user.

The flexible rod 1540 is preferably provided with a mounting point to enable a handheld device to be removably attached and supported by the flexible rod 1540. The handheld device 1560 preferably comprises a smart phone or tablet device. The device is preferably provided with wireless connectivity. Alternatively the mounting point includes a dock adapted to establish a physical connection with handheld device 1560.

The mounting point is preferably configured to pivot to enable a wide range of positions and angles for the handheld device 1560. Alternatively the flexible rod 1540 is sufficiently flexible to permit a selection of various angles.

In an alternative embodiment the mounting arrangement is fixedly or removably mounted to the barrier net 1510. The mounting arrangement is constructed to enable handheld device 1560 to be removably attached to the mounting arrangement so that in use the handheld device is supported in a position inside or outside the barrier net 1510.

Alternatively the mounting arrangement otherwise suspends the handheld device inside or outside the barrier net 1510.

In use the sensor arrangement 60 is able to communicate either directly or indirectly with handheld device 1560 over a wireless network, a wired network, or a combination of wireless and wired networks.

As the user jumps or bounces on the flexible mat 10 the bounce zones identified by the techniques described above are passed through an application programming interface (API) as input to the handheld device 1560.

Preferably the handheld device 1560 includes at least a processor, a display, and a user input facility. This user input facility includes for example a touch screen on the device 1260 and the inputs specified as bounce zones from the user on the flexible mat 10.

The handheld device 1560 operates under application specific software that takes as input data representing the bounce zones or locations or other measured activity from the user and uses these inputs to provide information and/or entertainment to a user viewing the handheld device 1560.

The device 1560 in combination with the trampoline embodiments described above provide apparatus relating to gaming, communication, rehabilitation and the like.

Preferably it is the application controlling the device 1560 that determines the function of the apparatus. In each case the device provides interaction with the user based at least partly on the activity of the user or an object on the flexible mat.

It will be appreciated that the mounting arrangement comprising the flexible rod 1540 could also include a shower proof hood or sunshade to protect the handheld device 1560 and/or to make the display more visible to the user. It will be appreciated that the display could also include a projector able to take input from the handheld device 1560 and to project an image or display on to a surface.

Bounce Zone Configurations

It is envisaged that there will be many different configurations for bounce zones which can be used as input to the handheld device 1560.

Figure 16:
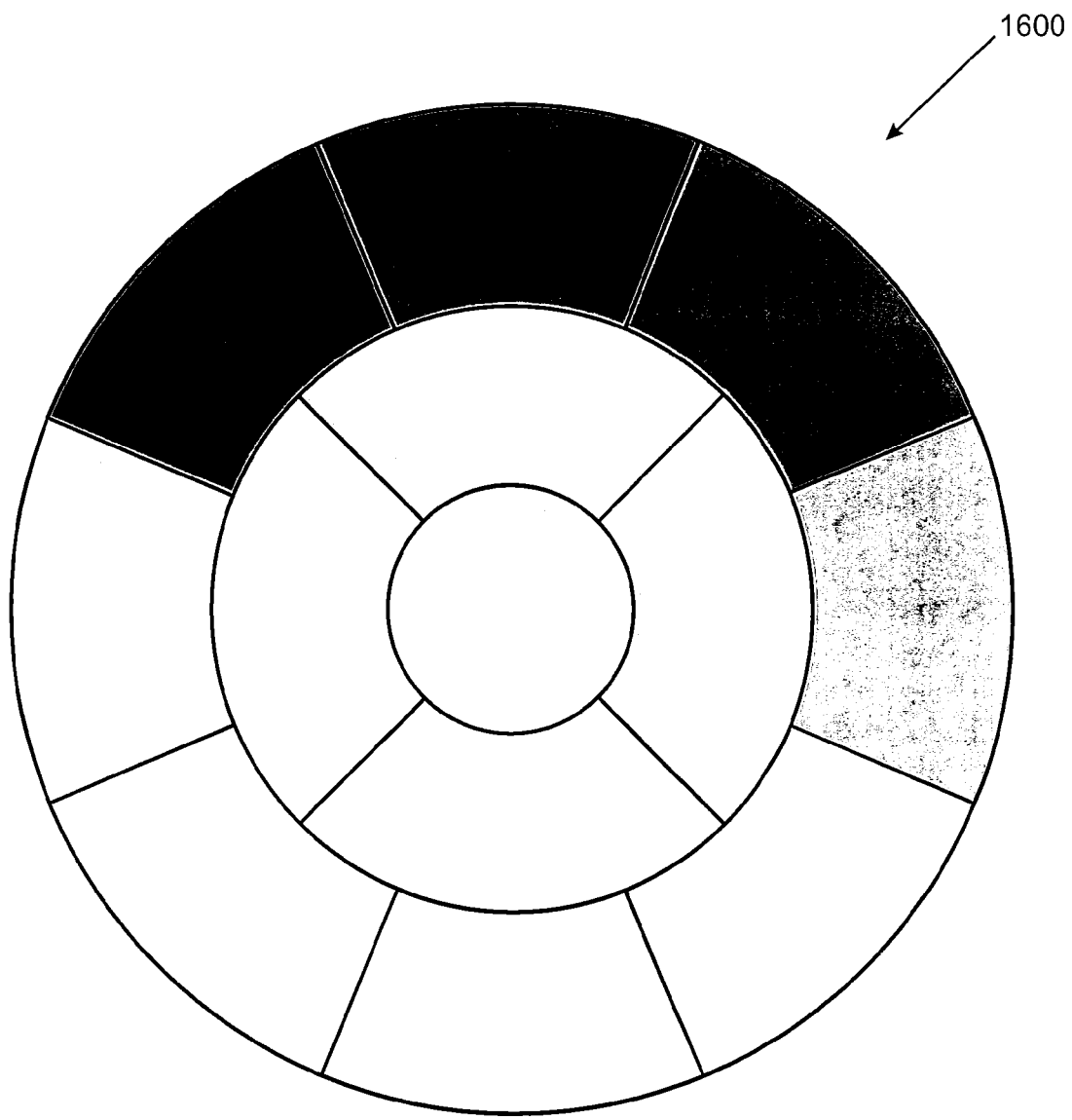
FIG. 16 shows a preferred form thirteen zone input configuration.

FIG. 16 shows one preferred form 13-zone configuration 1600.

Figure 17:
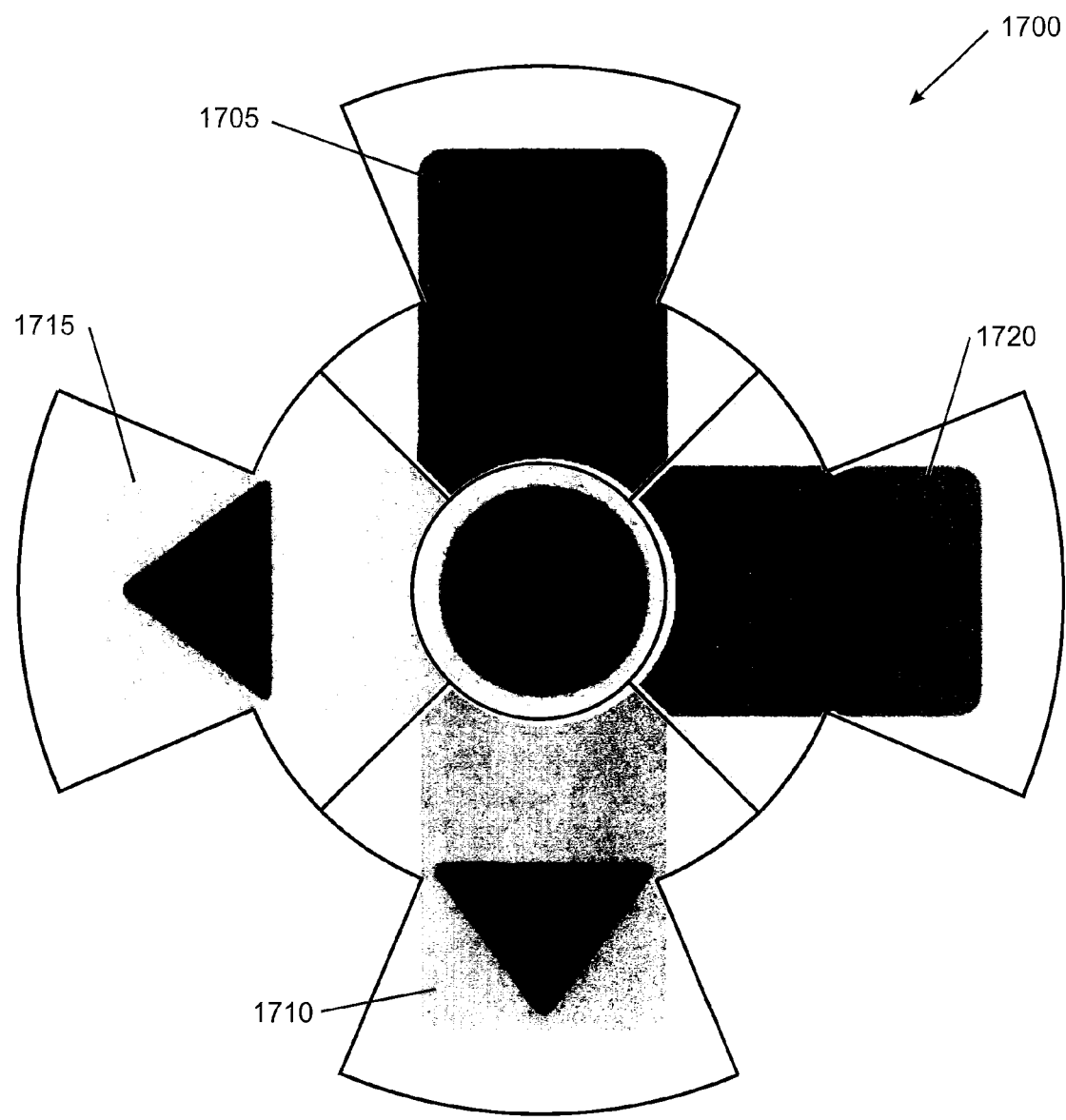
FIG. 17 shows a preferred form five zone input configuration.

FIG. 17 shows a preferred form 5-zone configuration 1700. The 5-zone configuration is preferably created by combining pairs of the 13-zone configuration 1700 from FIG. 16. The preferred form 5-zone configuration 1700 resembles a game controller directional pad suitable for games that require up 1705, down 1710, left 1715 and right 1720 inputs.

Figure 18:
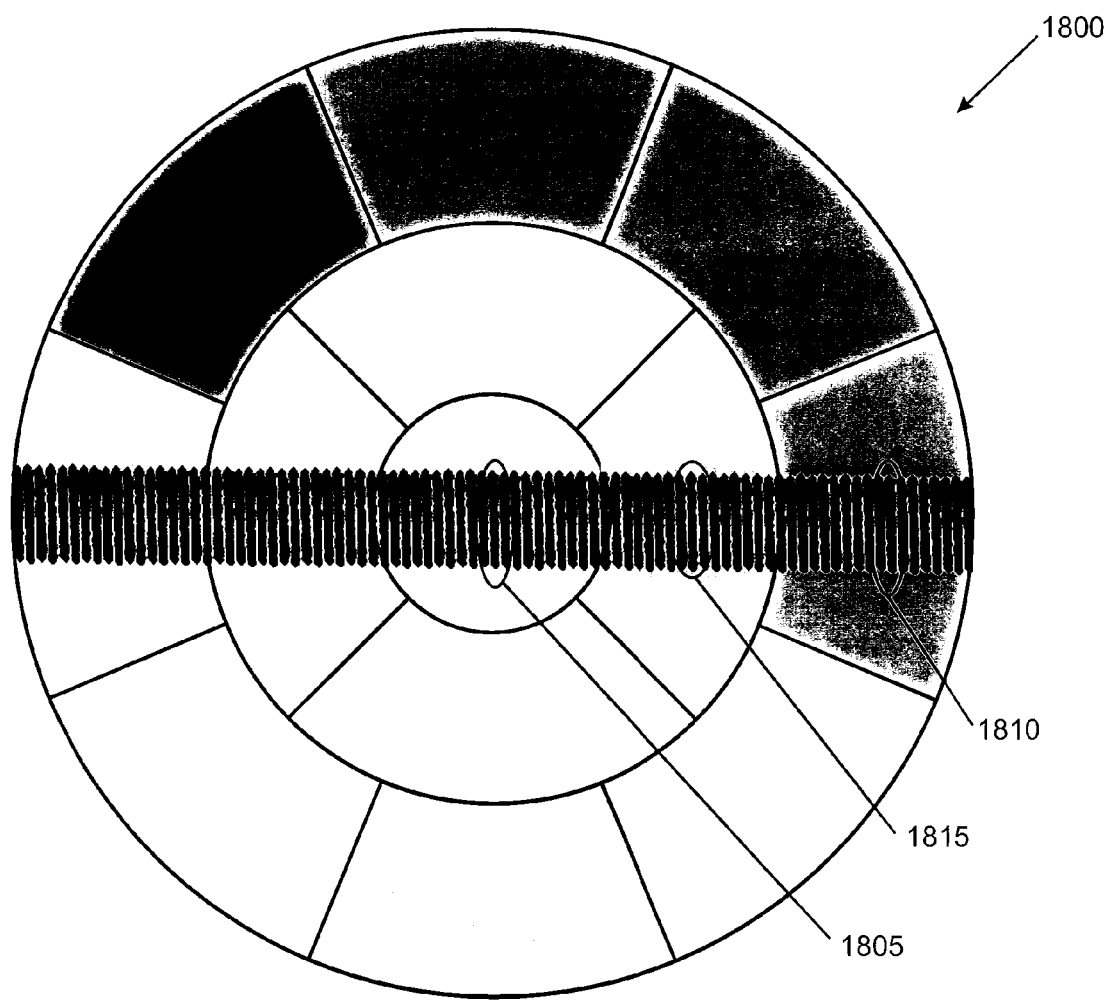
FIG. 18 shows a preferred form continuous scale input configuration.

A further possibility is shown in FIG. 18 at 1800 as a plurality of bounce zones across one of the major axes of the flexible mat. This configuration is intended to provide the user with a seemingly continuous scale of locations. This would suit games that would require movement in one direction at a higher resolution than possible in the 13-zone layout 1600 of FIG. 16 or the 5-zone layout 1400 of FIG. 17.

An example is where the user standing in a base location 1805 generates a larger signal if the user jumps to a position indicated at 1810 as opposed to a position indicated at 1815. This zone configuration enables a user to select a quantum, scale or acceleration of movement in addition to direction.

The foregoing describes the invention including preferred forms thereof. Modifications and improvements as would be obvious to those skilled in the art are intended to be incorporated in the scope hereof, as defined by the accompanying claims.

The invention claimed is:

1. A method of determining a bounce location of a person or an object on a flexible mat of a trampoline, the method comprising:

a sensor arrangement determining a mat deformation signal, the sensor arrangement comprising at least two pairs of sensors arranged around the periphery of the mat, the pairs of sensors defining respective axes that extend between the sensors and wherein the axes of two of the at least two pairs of sensors are orthogonal to one another in a Cartesian coordinate space and are substantially parallel to a weave of the mat, the sensors being configured to measure a value corresponding to a deformation of the mat as the person or object moves on the mat, wherein, when the person or object is on the mat, the value measured by one of the pairs of sensors corresponds to a proximity of the person or object to one of the sensors;

the sensor arrangement determining a bounce coordinate in the coordinate space based at least partly on the mat deformation signal; and the sensor arrangement determining a bounce location of the person or object on the flexible mat based at least partly on the bounce coordinate in the coordinate space.

2. The method of claim 1, wherein the mat deformation signal is an average of measurements from the at least two pairs of sensors.

3. The method of claim 1 wherein two of the at least two pairs of sensors define orthogonal axes that are offset with respect to a long axis of the flexible mat.

4. The method of claim 1 wherein the mat deformation signal is indicative of when the person or object departs the mat for a bounce and indicative of when the person or object impacts the mat from a bounce.

5. The method of claim 4, further comprising:
determining a departure time when the person or object departs the mat;
determining an impact time when the person or object impacts the mat; and
determining a bounce interval during when the person or object is on the mat, the bounce interval based at least partly on a difference between the impact time and the departure time.

6. The method of claim 5, wherein the bounce coordinate for the person or object on the mat is determined during at least part of the bounce interval, and after the mat deformation signal crosses a threshold.

7. The method of claim 6, wherein the threshold is determined based at least partly on measurements from the sensor(s) when the user or object is not on the mat and when the mat is not deformed.

8. The method of claim 6 wherein the bounce coordinate is determined between a time when the mat deformation signal exceeds the threshold and the departure time.

9. The method of claim 5, further comprising determining a flight interval when a user bounces off the mat, the flight interval based at least partly on a difference between the departure time and the impact time.

10. The method of claim 9, further comprising determining a bounce height of a person or object based at least partly on the flight interval.

11. The method of claim 9, further comprising determining a time of flight of the person or object based at least partly on the flight interval.

12. The method of claim 9, further comprising determining energy expended by a person.

13. The method of claim 9, further comprising determining calories burned by a person.

14. The method of claim 5, further comprising:
calculating respective sum of squared values for the sensor or at least one of the sensors during at least part of the bounce interval; and
normalising the sum(s) of squared values to determine the bounce coordinate.

15. The method of claim 14, wherein the sensor arrangement comprises four sensors, and wherein normalising the sum(s) of squared sample values comprises calculating respective normalised sum ŝ values for one or more sums of squared sample values using the formula:

$$\hat{s}_a = \frac{n}{2} \times \frac{s_a}{s_1 + s_2 + s_3 + s_4} \text{ for } a = 1 \ldots 4$$

where n refers to the size of the coordinate space to be used to represent bounce location,
a identifies the sensors; and
s represents the sum of squared sample values for the one or more sensors.

16. The method of claim 14 wherein the sensor arrangement comprises four sensors and wherein normalising the sum(s) of squared sample values comprises calculating respective normalised sum ŝ values or one or more sums of squared sample values using the formula:

$$\hat{s}_a = \frac{n}{2} \times \frac{s_a}{s_1 + s_2} \text{ for } a = 1, 2$$

$$\hat{s}_a = \frac{n}{2} \times \frac{s_a}{s_3 + s_4} \text{ for } a = 3, 4$$

where n refers to the size of the coordinate space to be used to represent bounce location,
a identifies the sensors; and
s represents the sum of squared sample values for the one or more sensors.

17. The method of claim 15 wherein sensors $s_1$ and $s_2$ comprise a first pair of sensors defining a first axis across the jumping mat, and sensors $s_3$ and $s_4$ comprise a second pair of sensors defining a second axis across the jumping mat transverse to the first axis.

18. The method of claim 17, wherein, where the coordinate space is a Cartesian coordinate space, the bounce coordinate in the Cartesian coordinate space is determined using the formula:

$$(x,y)=(\hat{s}_2-\hat{s}_1,\hat{s}_4-\hat{s}_3).$$

19. The method of claim 1, further comprising:
maintaining two or more trained bounce locations, the trained bounce locations recorded from one or more bounces on respective locations on the jumping mat.

20. The method of claim 1 wherein the sensor arrangement is in communication with a handheld device having a processor and a display, the handheld device configured to take as input the determined bounce locations.

21. A trampoline comprising:
a flexible mat;
a plurality of resiliently flexible rods each having a lower end retained by a frame of the trampoline and an upper end;
one or more fittings coupled to the mat about a periphery of the mat, the fittings adapted to receive respective upper ends of the flexible rods; and
a sensor arrangement comprising at least two pairs of sensors arranged around the periphery of the mat, the pairs of sensors defining respective axes that extend between the sensors and wherein the axes of two of the at least two pairs of sensors are orthogonal to one another in a Cartesian coordinate space and are substantially parallel to a weave of the mat, the sensors configured to indicate activity of a person or object on the mat.

22. The trampoline of claim 21 wherein at least four of the fittings include respective sensors.

23. The trampoline of claim 22 wherein the sensors are fixedly mounted to the fittings.

24. The trampoline of claim 22 wherein the sensors are removably mounted to the fittings.

25. The trampoline of claim 21 wherein the plurality of resiliently flexible rods have an approximately rectangular cross-section between the frame and the mat, the free length of the support rods between the upper ends and lower ends bowing outwards and curving upwards from the frame towards the mat substantially perpendicular to the frame to hold the mat in tension above the frame.

26. The trampoline of claim 21 wherein the sensor arrangement is configured to measure a value corresponding to a deformation of the mat as the person or object moves on the mat.

27. An interactive apparatus comprising:
   the trampoline of claim 21;
   a processor configured to receive as input data representing activity of a person or object on the flexible mat of the trampoline; and
   a display in communication with the processor, the display configured to display information and/or entertainment to the person based at least partly on the activity of the person or object on the flexible mat.

28. The apparatus of claim 27 wherein the trampoline includes an enclosure system, the enclosure system comprising a barrier net supported by at least one enclosure rod.

29. The apparatus of claim 28 further comprising a mounting arrangement comprising a flexible rod having a first end adapted to be mounted to the or one of the at least one enclosure rod and having a second end adapted to support the processor and/or display.

30. The apparatus of claim 28 further comprising a mounting arrangement fixedly or removably mounted to the barrier net, the mounting arrangement adapted to support the processor and/or display.

\* \* \* \* \*